(12) United States Patent
Uzar et al.

(10) Patent No.: US 11,449,507 B2
(45) Date of Patent: Sep. 20, 2022

(54) DATABASE ENGINE

(71) Applicant: SAVIZAR, INC., Hoboken, NJ (US)

(72) Inventors: Dillon Uzar, Hoboken, NJ (US); Tim Williams, Hoboken, NJ (US); Alex Sabella, Hoboken, NJ (US)

(*) Notice: Subject to any disclaimer, the term of this patent is extended or adjusted under 35 U.S.C. 154(b) by 153 days.

(21) Appl. No.: 16/646,470

(22) PCT Filed: Sep. 6, 2018

(86) PCT No.: PCT/US2018/049754
§ 371 (c)(1),
(2) Date: Mar. 11, 2020

(87) PCT Pub. No.: WO2019/055282
PCT Pub. Date: Mar. 21, 2019

(65) Prior Publication Data
US 2020/0293532 A1 Sep. 17, 2020

Related U.S. Application Data

(60) Provisional application No. 62/558,657, filed on Sep. 14, 2017.

(51) Int. Cl.
*G06F 16/2453* (2019.01)
*G06F 16/22* (2019.01)

(52) U.S. Cl.
CPC ...... *G06F 16/24542* (2019.01); *G06F 16/221* (2019.01)

(58) Field of Classification Search
CPC ............. G06F 16/24542; G06F 16/221; G06F 16/24532; G06F 16/2453; G06F 16/22
See application file for complete search history.

(56) References Cited

U.S. PATENT DOCUMENTS

| | | | |
|---|---|---|---|
| 6,353,821 B1 * | 3/2002 | Gray | G06F 16/24537 707/715 |
| 10,120,902 B2 * | 11/2018 | Erdogan | G06F 16/24544 |
| 2008/0301256 A1 | 12/2008 | Mcwilliams et al. | 709/214 |
| 2011/0202929 A1 | 8/2011 | Schleimer et al. | 718/106 |
| 2014/0032525 A1 | 1/2014 | Merriman et al. | 707/713 |
| 2015/0134643 A1 * | 5/2015 | Roy-Faderman | G06F 16/248 707/722 |

(Continued)

FOREIGN PATENT DOCUMENTS

WO WO/2013/001535 1/2013

OTHER PUBLICATIONS

"Understanding B+tree Indexes and how they Impact Performance", Jul. 14, 2011, online at http://www.ovaistariq.net/733/understanding-btree-indexes-and-how-they-impact-performance.

(Continued)

*Primary Examiner* — Dangelino N Gortayo
(74) *Attorney, Agent, or Firm* — Venable LLP

(57) ABSTRACT

In response to a query to a database, the identity of a slave machine which stores the requested data is resolved, and the query is parsed to identify one or more shards at the slave machine. Each shard corresponds to a partition of the requested data stored at the slave, and rows inside of the shard are respectively assigned a fixed-size local ID. Tasks corresponding to each shard are placed into a thread pool, and the threads are processed using the respective local IDs to obtain the requested data.

14 Claims, 13 Drawing Sheets

(56) References Cited

U.S. PATENT DOCUMENTS

2015/0286682 A1* 10/2015 Ziauddin ............. G06F 16/2282
                                                        707/718
2017/0286470 A1* 10/2017 Jin ........................ G06F 16/22
2017/0293657 A1* 10/2017 Kirk ................. G06F 16/24549
2019/0362006 A1* 11/2019 Ziauddin ............. G06F 16/2456

OTHER PUBLICATIONS

"B+Trees—How SQL Server Indexes are Stored on Disk", Jun. 18, 2014, online at https://sqlity.net/en/2445/b-plus-tree/.

MongoDB, "A Technical Introduction to WiredTiger", Jun. 1, 2015, online at https://www.mongodb.com/presentations/a-technical-introduction-to-wiredtiger.

S. Brass, "B-Tree Indexes", Universität Halle, 2005, online at http://users.informatik.uni-halle.de/~brass/dbi13w/c4_index.pdf.

"How do database indexes work?", Jun. 3, 2012, online at https://www.programmerinterview.com/database-sql/what-is-an-index/.

MongoDB Manual, "ObjectID", Version 3.4.6, Jul. 5, 2017, online at https://docs.mongodb.com/manual/reference/method/ObjectId/.

"MongoDB Index Internals", Feb. 19, 2014, online at http://zhangliyong.github.io/posts/2014/02/19/mongodb-index-internals.html.

"How do databases store index key values (on-disk) for variable length fields", Jan. 21, 2012, online at https://dba.stackexchange.com/questions/11189/how-do-databases-store-index-key-values-on-disk-for-variable-length-fields.

"UpscaleDB—Variable-Length Fields", May 31, 2016, online at https://upscaledb.com/about.html.

D. Comer, "The Ubiquitous B-Tree", Computing Surveys, vol. 11, No. 2, Jun. 1979.

E. McCreight, "Pagination of B*-trees with variable length records", Comm. of the ACM 20, No. 9, Sep. 1977.

International Search Report and Written Opinion in counterpart PCT/US2018/049754.

* cited by examiner

DATABASE ENGINE

CROSS REFERENCE TO RELATED APPLICATIONS

This application is a national stage filing under 35 U.S.C. § 371 of international application No. PCT/US2018/49754 filed Sep. 6, 2018, and claims benefit of priority from U.S. Provisional Application No. 62/558,657 filed Sep. 14, 2017, the content of all of which is incorporated by reference as if set forth here in full.

BACKGROUND

Technical Field

This disclosure relates generally to accessing databases, and more particularly to querying databases for stored data.

Description of Related Art

In the field of data storage and management, it is common to query a database for stored information. For example, a user might input a query to a proprietary search engine at a company, in order to obtain desired data and/or perform required functions.

Nevertheless, existing database and query methodologies are subject to several limitations, particularly from a speed perspective. For example, in a large enterprise or with a complex set of data, the time to process a query may be undesirably long. Efforts to reduce the delay by changing programming languages or using different database types have not eliminated the problem, and may introduce additional cost and delay, or in some cases may simply be impractical. As an additional matter, existing database methodologies may lead to sub-optimal usage of other resources, such as memory or processing power.

Accordingly, there is a technical challenge to reduce the response time for processing a query in a database system, as well as to improve efficiency of resource usage required to process the query and to return desired results.

SUMMARY

The example embodiments described herein address the above-identified challenges by providing systems, methods, and computer program products for a database engine which includes an acceleration layer for speeding up existing workflows.

In one example embodiment, a query to a database is processed. A query to obtain data from the database is received. The identity of a slave machine which stores the requested data is resolved, and the query is parsed to identify one or more shards at the slave machine. Each shard corresponds to a partition of the relevant body of data stored at the slave, and rows inside the shard are each assigned a respective fixed-size Local ID. Tasks corresponding to each shard are placed into a thread pool, and the threads are processed using the respective local IDs, to obtain the requested data.

As mentioned, shards are a partition, or a slice of the data, and are themselves each assigned an ID. However, the Local IDs referred to above are not to specifically identify the shard, but rather correspond to rows within the shard. In more detail, it is convention in a database that each row or item in a dataset is assigned a Global ID (or Route IDs, as discussed more fully below). According to this disclosure, shards are slices of a dataset (and more specifically are slices of the portion of a dataset that is resident on a particular server), each containing many rows or items. When executing a query on a Shard, the systems described herein resolve all Global/Route IDs to Local IDs. This conversion is made possible by each Shard storing a lookup table that allows it to resolve Global/Route IDs to Local IDs. As described below, these Local IDs assigned to rows of a Shard are used to simplify logic and reduce storage space required to be devoted to indexes.

Further features and advantages, as well as the structure and operation, of various example embodiments of the present invention are described in detail below with reference to the accompanying drawings.

BRIEF DESCRIPTION OF THE DRAWING FIGURES

DETAILED DESCRIPTION OF THE PREFERRED EMBODIMENTS

Figure 1:
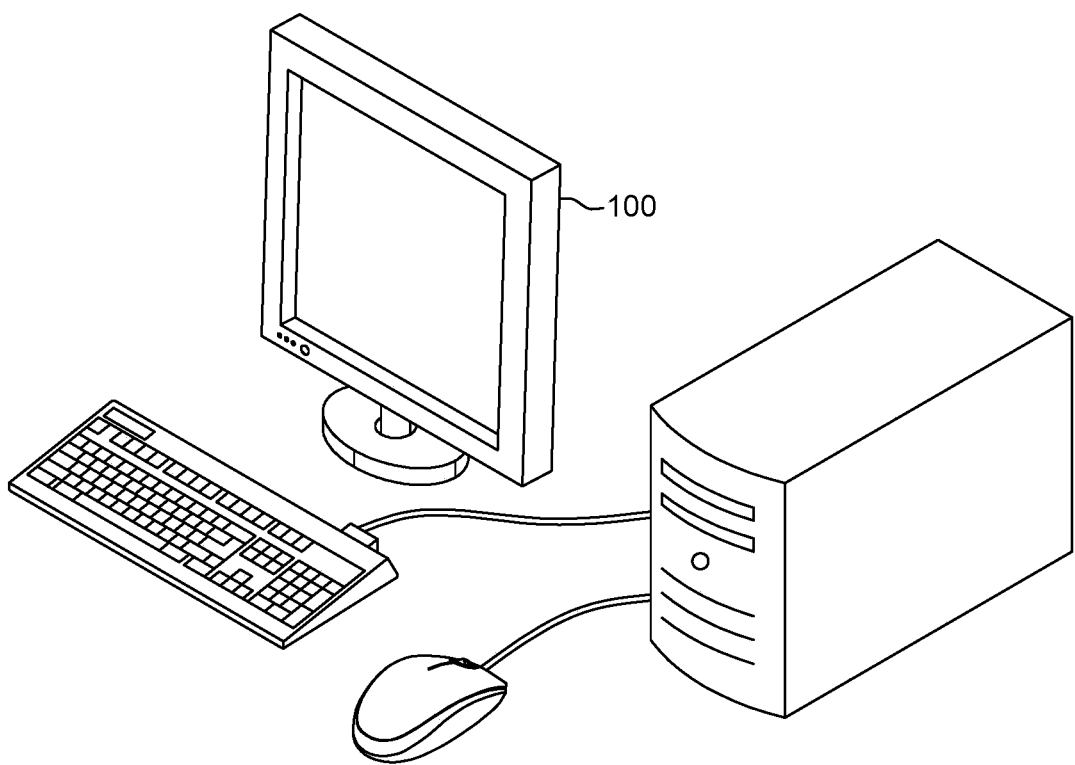
FIG. 1 is a representative view of computing equipment relevant to one example embodiment.

FIG. 1 illustrates an example embodiment of computing equipment in which aspects of the present disclosure may be practiced.

While FIG. 1 depicts a computer, the computing equipment for practicing the aspects of the present disclosure can be implemented in a variety of embodiments. For example, in an enterprise database environment, the computing equipment might be included as part of a larger, company-specific terminal. The computing equipment might also be included in mobile equipment such as a tablet or smartphone. Still other embodiments are possible according to the application and environment.

Figure 2:
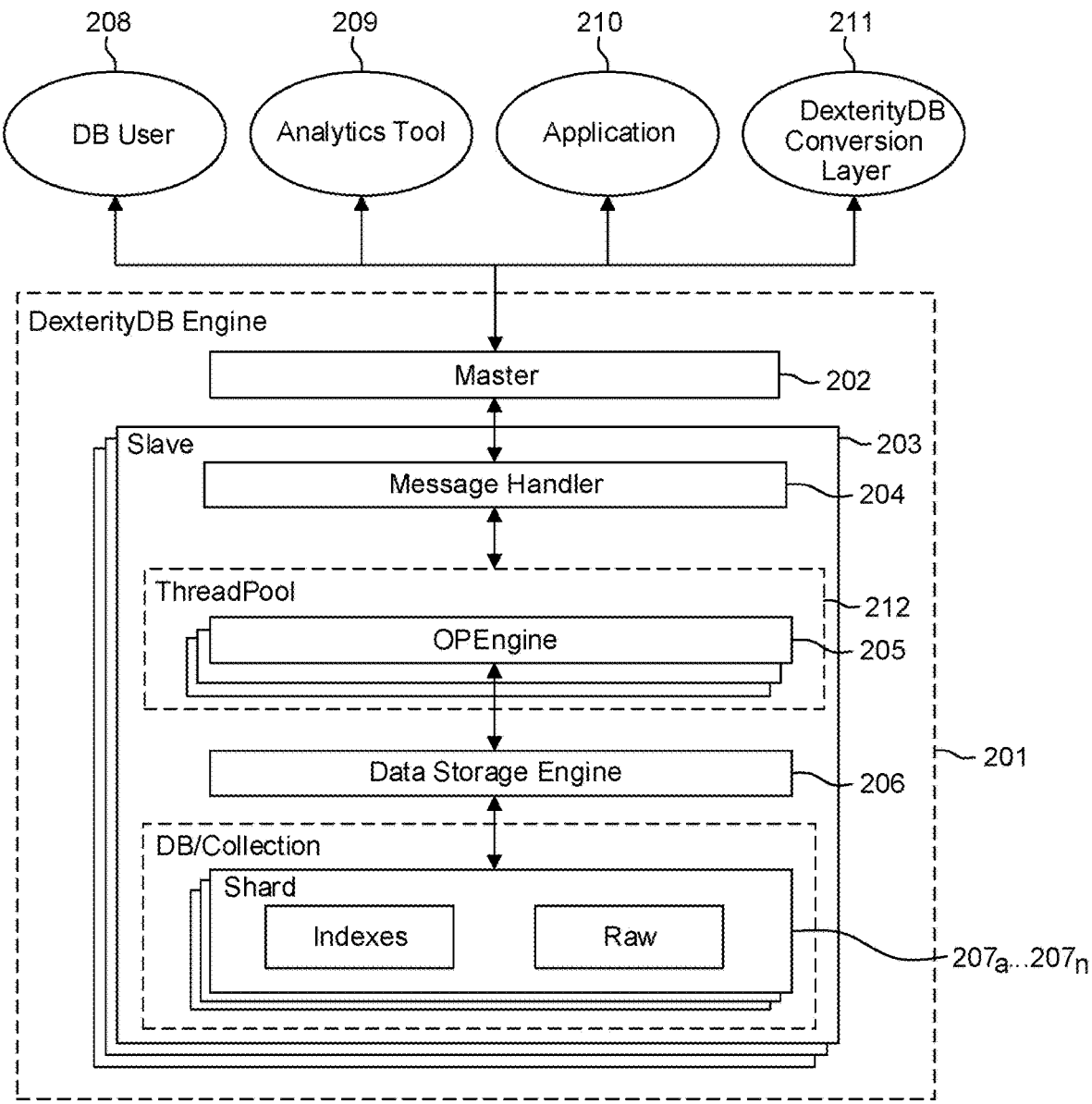
FIG. 2 is a block diagram of a database architecture according to an example embodiment.

FIG. 2 is a block diagram of a database architecture according to an example embodiment. This architecture is sometimes referred to herein as the "DexterityDB Engine" or, "DexterityDB Engine 201" (both "DexterityDB" and "DexterityDB Engine" are trademarks of Savizar, Inc). In that regard, the DexterityDB Engine 201 supports, e.g., a low level application programming interface (API), or a structured query language (SQL).

In general, DexterityDB Engine 201 is designed to speed up the computation of analytics and complex queries, and to work with large datasets, the number of rows of data can reach tens of millions to billions, or even trillions, of rows and objects. (In that regard, the various aspects of the present disclosure are usable with various kinds of databases. For example, a document database is different from a normal SQL database. Instead of containing tables of rows and columns, it contains collections of objects with fields. This allows for advanced organization in which a field on one object can actually contain another object or an array of objects, allowing a hierarchy with these nested objects.)

Due to this, DexterityDB Engine 201 is designed to scale both vertically (operate with increased CPU core counts in the database servers), and horizontally (operate with increased numbers of servers in the cluster). In order to achieve this, a master-slave configuration is used in certain embodiments. The master 202 is in charge of coordinating communication between slaves, and directing the user's queries (e.g., such as DB user 208) to the slaves who contain the data those queries interact with.

Before describing this approach further, it is noted that in other example embodiments, a "RouteID system", described below, utilizes a "hivemind" style system, also referred to as a "Distributed system", where no master is required. Instead, a slave is elected as a master for a specific query, based on various parameters to optimize the query time. Or, users could treat any one slave as a master to handle their queries. This is because a central server is not required to sync the ID assigning, and instead the cluster can work together to balance data, and user queries.

Briefly, the slaves are in charge of processing and executing the queries, as well as storing the data. Slaves usually exist on separate servers from each other, and when more than one computer is used, the master 202 usually gets its own server. Here, the slave 203 can exist on, e.g., a server. An arriving query first reaches the message handler 204. The message handler 204 is a known software component that is in charge of receiving a message and passing the message to an appropriate component of the system for handling—here, it deciphers the query to determine what databases and/or collections need to be accessed, for example. After the database(s) and/or collection(s) are identified, the message handler 204 identifies what shards need to be accessed. A shard 207 is one partition of the partial collection stored on the (this) slave 203. A collection can be broken up into pieces and spread across multiple slaves. The slave 203 then can divide these pieces further into shards 207. One purpose is to maximize the processing power on the server on which this slave 203 resides, typically by attempting to maintain at least the same number of shards 207 as there are CPU cores on the slave server. There are exceptions to maintaining at least the same number of shards as there are CPU cores. With small datasets, for example, it may in some instances be advantageous to have fewer shards than cores. With large datasets, on the other hand, it may be advantageous to have many multiples of shards for every core. In addition, grouping small shards together can be more performant than making few large shards. This is also helpful in circumstances where there is an increase or decrease in the core count, for the reason that there is no need to rebalance the shards and create or delete old ones to account for new hardware. Instead each core may have many tiny shards, and when new cores are introduced they take a handful of shards from all the other cores. This makes rebalancing easier, and allows for optimizations.

As one example of such optimizations, a dataset with billions of rows may have thousands of shards on an 8-core server. The shards are evenly divided among the 8 cores, and 8 tasks are spawned when attempting to run a query across all of them. Generally, this gives the same, and often better performance than having 8 shards with each having 100s of millions of rows. By having larger shards, the performance when accessing each data point can take sometimes $O(\log 2(n))$ where n is the number of rows in the shard. By having smaller shards, but many of them, it hits the cap of the smaller scale $O(\log 2(m))$ where m is the max size of the shard.

Once the shards 207 that need to be involved in processing the query are identified, the message handler 204 spawns one task per shard and adds the task to ThreadPool 212's job queue. In other embodiments, which can sometimes improve performance when there are many small shards, thereby to reduce the overhead of the ThreadPool, shards may be grouped together to create the same number of groups as there are cores, after which one task is created per group of shards. This job queue is a first-in-first-out (FIFO) queue. The ThreadPool 212 can simultaneously process the same number of tasks as there are CPU cores on the Slave server. Each task is run using the OpEngine 205. OpEngine 205 is a combination of circuitry and logical code which executes commands on data, based on a parsed query. The particular way an OpEngine 205 goes about this process might depend on different threading policies, query language, data types, and so on. Each of these processes will be described more fully below.

The OpEngine 205, in turn, is directly in charge of parsing and executing the query. It is essentially the logical layer of the slave. The OpEngine 205 is designed to map queries one-to-one with the data layer, without having to perform complicated conversions between logic and data. When the OpEngine 205 needs to access a stored piece of data, such as an index, it uses the data storage engine 206. The data storage engine 206 provides a simple interface to the collections and the collections' shards 207 stored on the slave. For example, when a query is asking to look up all people between the ages of 25 and 35, the OpEngine 205 will ask data storage engine 206 for a slice of the "Age" index that meets those conditions, and uses that in its computation.

In more detail, OpEngine 205 is the logical code that sits on each slave (e.g., slave 203) that contains the query engine, and manages execution of query operators. It's in charge of determining how to execute the query optimally. Multiple instances of OpEngine 205 can exist on slave 203, and preferably one will exist for each thread generated in the ThreadPool 212. Thus, for example, one or more instances of OpEngine may be instantiated in response to receiving a query, once the number of tasks in the query is identified, in order to map the query one-to-one with the data layer. Multiple instantiations are made by generating and executing copies of the logical code which constitutes the OpEngine. The maximum number of threads is equal to the maximum number of threads the CPU(s) can execute in parallel at once. The ThreadPool 212 is designed to take in jobs and execute them in the OpEngine 205. The ThreadPool 212 acts as a first-in-first-out queue with the jobs. Additional details on the ThreadPool 212 are provided in the following paragraphs. The message handler 204 is responsible for very quickly determining how to split an incoming message into an optimal number of jobs to execute on the ThreadPool 212

(what is considered the optimal number of jobs, and how this is done, are discussed below). It also grants the jobs executed exclusive access to a shard 207 while running (preventing multiple threads from writing to the same shard at the same time). This usually will guarantee that queries can be run without being blocked (i.e. denied access to a shard due to an ongoing access), because according to this embodiment there are the same number of shards as there are threads in the ThreadPool 212, and thus a new query and corresponding thread(s) can just go to another unlocked shard.

For ThreadPool 212, as mentioned, the FIFO (First in First Out) queue maintains transaction order, and further features of the ThreadPool 212 maintain transaction order so as to ensure correctness across the entirety of a whole transaction, to ensure ACID compliance. "ACID" refers to Atomicity, Consistency, Isolation, and Durability, and is a set of properties of database transactions intended to guarantee validity even in the event of errors, power failures, and so forth. Specifically, in the embodiment, the order of tasks executed always respects the Isolation property of ACID. This means that transactions, which could be executed in parallel, are executed in a way so the result is as if they were executed sequentially. This whole system has three parts—a Task Scheduler, a Resource Manager, and the Thread Pool. In these three parts:

Scheduler—organizes the order of tasks, ensuring maximum parallelism, while maintaining Isolation.

ResourceManager—handles resource dependencies between queries and transactions, and negotiating with the Scheduler on how things could be reorganized to still ensure ACID, while the Scheduler gets its parallelism.

ThreadPool—executes the tasks across the CPU cores efficiently, managing the results and order of execution, while informing the ResourceManager of release of resources.

This system tracks queries at a high-level, and splits up parts of a query into multithreaded parts. Internally the task scheduler has a thread pool that then executes those parts, based on the order given by the scheduler. When one query is sent to the database, it is split across the threads executing stuff in the right order to complete the query. When multiple queries or transactions are sent at once, the scheduler identifies the resources each one needs, and schedules the order of parallel tasks so that they are executed in the right order not only for the query/transaction it belongs to, but also so it preserves the Isolation property when threading transactions.

This structure allows parallelization of transactions while maintaining the appropriate ACID properties, while minimizing the number of locks. One example of parallelization of transactions while minimizing the number of locks is shown in FIG. 10, where blocks are transactions, the X-axis is time, and the Y-axis is CPU utilizations (parallelism).

Figure 10:
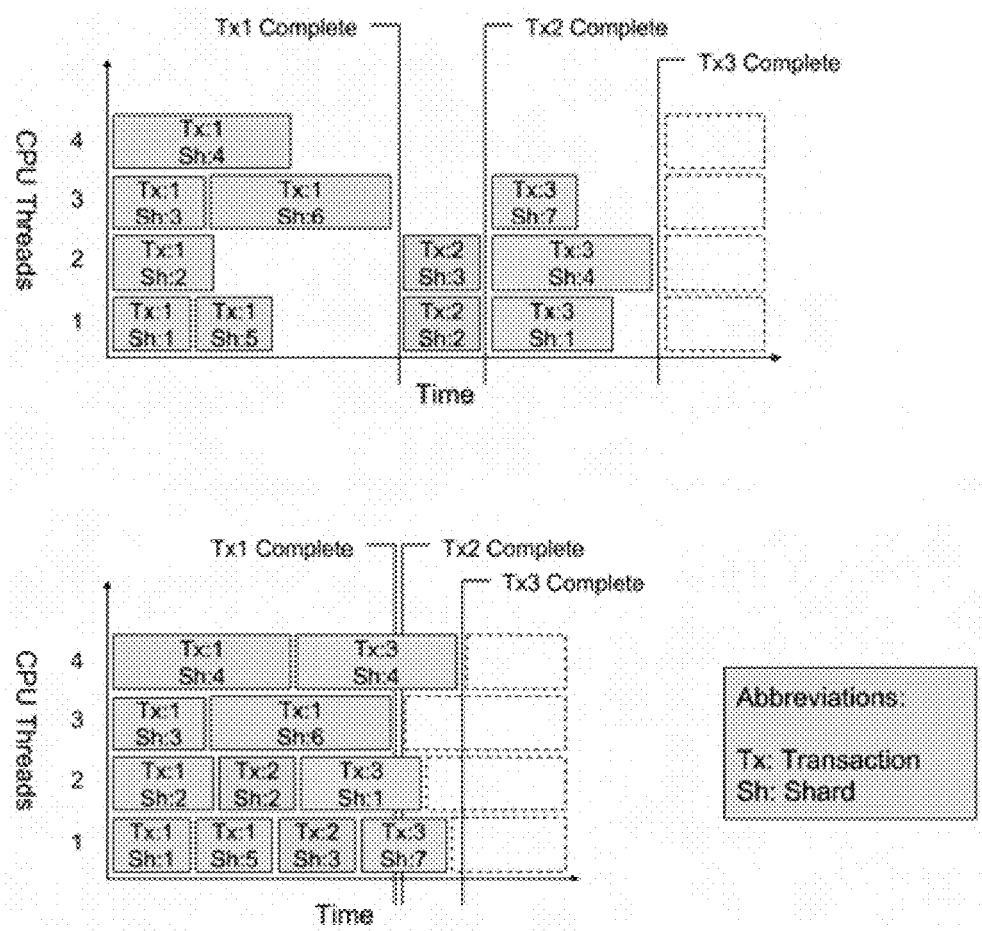
FIG. 10 is a diagram illustrating parallelization of transactions while minimizing the number of locks.

FIG. 10 demonstrates how dependent transactions can be organized while maintaining ACID properties. This demonstrates how the transactions are scheduled if all three of the transactions are already in the queue. Scheduling may appear differently if the transactions are not already in the queue, at least for the reason that the scheduler does not know what transactions may come from the user.

In FIG. 10, the top diagram shows how conventional schedulers using collection locking would likely organize transactions for partitions. If there are no partitions, then instead of splitting the transaction(s) across threads, the transaction(s) will use one thread and execute one after another in order of dependency. There are no overlapping transactions.

The bottom diagram of FIG. 10 illustrates operations of the scheduler according to the embodiment. As shown in FIG. 10, the scheduler locks at the shard level, while allowing dependent transactions to execute at the same time. Transaction 2 is not obligated to wait for Transaction 1 to finish before Transaction 2 starts executing. As a result, the following advantageous effects are obtained:

Transaction 1 is independent. Transaction 2 depends on changes from Transaction 1. Transaction 3 depends on changes from Transaction 1.

In Transaction 1, Shards 2 and 3 were scheduled to execute right away. This was done so that Transaction 2 can begin as soon as CPU resources free up (which occurs after Transaction 1 Shard 2 completes).

Since Shard 2 was already in use by Thread 2, Transaction 2 Shard 2 is executed on the same Thread to maximize cache efficiency and to avoid the need to re-lock the Shard. The same thing occurs with Shard 4 in Transaction 1 and 3.

Transaction 2 completed before Transaction 1, however Transaction 2 cannot be considered "complete" since it depended on Transaction 1's changes to Shards 2 and 3. Transaction 2 is put aside until Transaction 1 completes, then Transaction 2 can complete.

Transaction 3 was able to start before Transaction 1 completed, since Transaction 1 finished using Shard 1 and 4, and because no other transaction had to use Shard 7.

It should be noted, that in some cases the scheduler can estimate how long an operation on a Shard will take. When this is possible, the scheduler may use that information to determine how to minimize the time it takes to complete a Transaction. This feature is not illustrated in FIG. 10, but a description of such operation follows here. Specifically, if the scheduler is able to accurately estimate the time for each Shard, Transaction 1 would execute Shard 6 changes on Thread 1 instead of executing Shard 1 and 5 changes on Thread 1. Then Shard 1 and 5 changes would be distributed to Thread 2 and 3, respectively. This would reduce the total time it would take to execute Transaction 1, and in fact, all four threads would be used by Transaction 1 until it completed, with Transaction 2 and/or 3 starting after, which may be more efficient overall.

In one difference from conventional database engines, the embodiment breaks up a collection so that multiple transactions can work on a collection at once. In contrast to database engines which might allow only one at a time, or require row-level locks, the embodiment instead employs shard-level distribution. As a result, since shards act as slices of a collection, almost like partitions, there is essentially a dedication of a slice of the collection to the transaction. The slice is small enough on large datasets that the collection can easily be split up across any modern CPU setup to maximize core usage. And this is all done without locking at each item (which is very expensive to invoke a lock, so doing it per item is really expensive), or without locking the whole collection (which prevents parallelism between transactions even when CPU resources are available). ACID is maintained by the Resource Manager & Task Scheduler to ensure each transaction gets the right slice at the right order, and if a transaction rolls back, it undoes the appropriate calculations on the transactions that relied on that transaction too.

As a result, the results of a transaction are sent in the order received in dependence on whether they depend on each other.

As one example of a roll-back of a transaction, consider a scenario where there are transaction X, Y, and Z, which are configured to behave as if they were executed in that respective serial order. Let X be a mass row update, Y a single row insert, and Z a mass row delete.

X finishes most of its tasks, and some CPU resources free up. So Y starts executing, despite X not being finished yet. Some resources free up so Z starts. Y finishes. Now X encounters an issue. To recover, there is roll-back of the following:

1. Z undoes its current operations on the shards it has done.
2. Y unrolls the changes it made to the shards it did.
3. X undoes its current operations on the shards it has done.

At this point, the user can be informed that has failed. Then Y and Z can start executing again, or the user might specify that the engine should fail Y and Z if X fails. It is also possible to optimize the process of unrolling to prevent the unrolling of completely independent operations that do not need to be unrolled. For example, if it is known that the changes made by Y do not need to be unrolled because these changes do not touch changes made by X, and same with Z if it did not yet modify anything that X touched (as Z was still executing), there would only be a need to unroll changes in Y and Z that X modified beforehand.

As an example of this latter behavior, consider the scenario of a bank account where the customer is making a purchase, which naturally decreases their account balance (transaction 1). Then they sell something (transaction 2). If transaction 1 fails while transaction 2 is executing, it will need to unroll transaction 2's modifications that transaction 1 affects. This is because transaction 2 made changes based on the balance of what transaction 1 finished with. If transaction 1 unrolled without also unrolling transaction 2, an erroneous situation would arise such as:

Balance: $1000
Buy: −$50 (transaction 1)
Balance: $950
Sell: +$100 (transaction 2)
Balance: $1050
Fix: =$1000 (transaction 1 fails, unroll by setting to original balance before transaction 1)
Balance: $1000 (changes made by transaction 2 are lost)

In some embodiments, unrolling may be performed by unrolling differences. For example, assuming it wouldn't have caused transaction 2 to fail:

Balance: $1000
Buy: −$50 (transaction 1)
Balance: $950
Sell: +$100 (transaction 2)
Balance: $1050
Fix: +$50 (transaction 1 fails, unroll by adding back difference)
Balance: $1100

It should, however, be recognized that unrolling of differences will not work in all cases, such as in a scenario where the transactions were:

Balance: $0 (Start condition)
Sell: $40 (transaction 1)
Sell: $20 (transaction 2)
Buy: $50 (transaction 3)
Sell: $100 (transaction 4)

In this scenario, if transaction 1 failed, technically transaction 3 should fail because there is not enough balance to buy. So, in this scenario, unrolling of differences will give an incorrect result, since by adding back the difference, it will treat transaction 3 as a success, when really it should be a failure. This can also cascade if other checks are involved, like transaction 4 might not work because transaction 3 was to buy the product sold in transaction 4.

Not all sequential transactions are dependent of the ones before it. This is means that it is not absolutely necessary to rollback transactions that don't depend on those executed on the slices before it. This does allow sending of results of some transactions out of order that they are received, provided the OpEngine, Task Scheduler and Resource Manager can determine that the transactions are independent.

Of course, other options are possible. In one aspect, jobs can be paused after a certain amount of execution time to allow other tasks to come in and execute. Then the jobs are resumed afterwards. This only occurs on large or long queries. This helps when multiple users are querying against the same collection, but with different tasks. It tries to serve them roughly equally, that way simple queries return quickly, while long queries (usually large insert or update queries) don't block other tasks.

According to further such option, the ThreadPool may also be designed to allow for timers that trigger tasks, like one every couple of seconds, to force a flush of the changes in RAM to the disk, or to trigger a backup of the changes in data in the last hour. Another feature is to allow for idle tasks, where tasks only get executed when there are no active tasks. An example of this is a healing system where it defrags and "fuses" blocks (which in some embodiments are defined as a "disk page") in order to speed up reads. Tasks that are time-based or idle-based can have a priority, which denotes if they should take precedence over other tasks. Consider, for example, a scenario where a snapshot backup is needed every 30 minutes. In such a scenario, a time-based task is set with an interval of 30 minutes. At every 30 minute interval, all current active tasks are finished up, the rest of the tasks are delayed, and the backup task is inserted to be executed immediately. Other priorities include inserting the time-based task to the end of the task queue (instead of the front like the high priority backup), or inserted as an idle task if the database is very busy at that time. Idle tasks can be given a timeout though where they get converted to a task on the queue if too much time passes.

A healing system may be implemented, in which, on idle, a task will spawn on the thread pool and scan the data files for fragmented blocks, like ChainBlocks or ChainTreeNodeBlocks, and "defrag" them to be contiguous. It will go one step further and "fuse" the blocks together. These blocks are often 4 KB in size, so fusing them makes one big 8 KB block. More blocks can be fused together until the whole data file is one large block. The difference between this and defragging is that defragging simply converts fragmented blocks into contiguous blocks. The healing system combines them into one block, eliminating the need for those pointers in the uncombined blocks that had previously been needed to identify where the next or previous block was located. This combines the defrag benefits with reduced storage overhead. Perhaps more significantly, ChainBlocks that are combined can utilize a tighter "for" loop (fewer operations inside loop so each iteration takes fewer clock cycles to complete) more often when scanning a larger contiguous block, reducing the interruptions that occur when needing to jump to another fragmented block. This reduces I/O, makes the CPU perform fewer cache misses because it can more accurately predict the RAM it needs to fetch, and overall reduces performance impact of I/O and random data access.

Such a healing system provides advantageous effects, particularly when there is idle time to perform "healing" and "fusing", and can speed up read operations (analytical queries and searches). When the database is hit with a lot of write requests at once it will not be idle and the healing system will not run. Since the blocks are "fused", it rarely makes sense to insert 4 bytes into a 64 KB block since there is a resulting penalty of moving over 50 KB to insert the 4 bytes into the right spot. So instead, during writes, the database can choose to "break the ice". In other words, it can break the fused blocks, converting the blocks around the insertion point to 4 KB blocks, and insert the data (and possibly allocated a new block, that is not collocated, which holds some of the broken up data so that there is room to insert). One benefit is instead of moving 50 KB, it instead suffices just to move up to 4 KB of data. This speeds up writes when the database is in write-heavy mode. When the database goes back to idle or mostly reads it can perform the healing process, defrag, and "fuse" the blocks back to together.

The healing system may be combined also with defragmentation and rebalancing aspects for even further improvements. Based on the embodiment's Index and ID systems, performance can be improved to eliminate IOPs being a bottleneck (input/output operations per second), even on a hard drive, while further maximizing the efficiency of TSC (see below at Template Schema Compression), ESC (see below at Entropy Skip Compression) and others when idle time is available.

Defragging the Memory-Mapped Files can result in better I/O efficiency by co-locating the 4 KB blocks together that reference each other, allowing the engine to utilize more sequential disk operations rather than random operations, thereby to eliminate IOP bottlenecks.

Rebalancing the rows/documents/items across Shards and servers keeps like-data together. Doing so simplifies the number of template schemas, enables better compression ratio of ESC, and reduces the number of duplicate keys in the indexes sharded across the cluster, which takes more advantage of the ChainBlocks while reducing ChainTree sizes. All of this not only improves storage but can also improve read and write performance due to reduced storage size and I/O.

Healing split and unfilled blocks can help to improve storage utilization ratios, and reduce the RAM and number of I/O operations to perform a task. As write operations are performed, blocks may be split in the storage engine to enable quick writes. By redistributing and fusing blocks back together, not only does it replace unused space with useful data, but it removes the split overhead to free up more storage space and can enable certain speed improvements on future operations.

The OpEngine 205 utilizes the data storage engine 206 to access raw data and indexes. When it loads indexes, it converts the iterators (container objects corresponding to functions to be performed on the raw data) returned into OpIters (operation iterators), iterates through the indexes, and performs operations to merge indexes to get to the final query's desired result. Some examples of operations that can be performed on the OpEngine 205 include:

Count operations (get count of results)
Fetch operations (returns row data based on the results or the input), aggregates and other filters. Here, it should be understood that multiple cores can be utilized (vertical scaling) as a result of the shards being run in parallel.
Insert operations (inserts new rows). Here, it should be understood that batches of inserts can be split up into multiple tasks (thanks to having multiple shards), allowing parallel inserts.
Update operations (updates existing rows based on matching conditions). Here, it should be understood that this essentially is a fetch operation that then updates, so it is run in parallel thanks to sharding.
Remove operations (removes existing rows based on matching conditions). Here, it should be understood that this essentially is a fetch operation that then deletes, so it is run in parallel thanks to sharding.
Aggregate operations
Other filters
List operations (returns a list of row Global IDs or Route IDs that are in the results). It should be noted, however, in the embodiments using RouteIDs discussed herein, it is unnecessary to have the list operations. Instead a temporary data set is generated by each query, called a ResultSet. Commands are provided to access data from ResultSets, which basically replace Count, List and Fetch operations. Instead, these operations are replaced with a Cursor API, where you can send a Query operation, which returns a ResultSet ID, and use a CursorFetch and CursorCount to retrieve data from the ResultSet. With this change of the Cursor API, aggregates and other filter operations are a subcategory under Cursor. It should also be recognized that such list operations may disadvantageously expose the IDs to the users, thereby causing complications if items were rebalanced while the user is using the Cursor API. As such, in certain embodiments, list operations might not be performed. Instead behind the scenes and hidden from the user, some equivalent list operations might be performed, when using an algorithm that is more optimal to use this method, so as to satisfy a query that will instead return the fetched results.

In this regard, the above operations can also be strung together to perform more complex operations.

All operations that require filtering can use the following non-exhaustive list of operators to load from the indexes:
Equality Load Operators: LESS_THAN, GREAT_THAN, LESS_THAN_OR_EQUAL, GREAT_THAN_OR_EQUAL, EQUAL
Range Load Operators (a combination of one or more of the equality load operators)
LIKE expressions
REGEX and partial comparisons
OpEngine 205 may also perform index intersections and unions like the Boolean operators AND and OR. In that regard, an AND operator is an INTERSECTION in Set Theory. An OR operator is a UNION in Set Theory.

In one example, the OpEngine 205 is designed to use exclusively indexes, not raw collection scans, to execute all queries, in order to optimize the index system as much as possible to provide speed increases in the handling of normal queries.

The OpEngine also may be focused on the idea of "Fetch-less Operations". This means it attempts to perform as much of the query as possible with only indexes. In a lot of row-based databases, the Operation Engine, or Query Planner, will only use one index, then fetch all raw rows and perform the rest of the query off that. There sometimes may be a slight disadvantage to this arrangement, in that fetching raw rows is expensive and disadvantageously takes up a lot of memory if not all of that data is needed. Instead, in the embodiment, combining indexes together as much as possible to satisfy a query saves RAM usage and time. This can be done because indexes herein can be used together since the ItemIDs are sorted on each key of the index, thereby allowing the performance of quick Set operations, while using less RAM and computation than if the raw data was used.

In one example of "Fetch-less Operations", consider a scenario in which the following query is given:
SELECT*FROM table WHERE id>5 AND lastname="Smith";

The query is broken down into two stages: the filter stage and the fetch stage. At no point is the data fetched in any other stage but the fetch stage, provided there is coverage of the index. Due to how indexes in these embodiments work, there is benefit in utilizing them for as much of the query as possible, as it uses less 110, RAM, and computation. So filtering is performed, and then since all of the columns are required, only then are the rows actually fetched.

Many databases fetch the rows either as they read each entry in an index, or after the first index sub-stage. All subsequent stages use the fetched data. Such an arrangement often leads to problems since fetching uses up computational time as most databases need to look up and parse the data. This uses large amounts of RAM too, which might require paging, even further reducing performance and essentially killing multi-query performance. Since the ItemIDs are so small, it is generally better to utilize them instead of the row data, so one benefit of fetch-less operations is to perform parts of the query without fetching the data. The embodiments herein attempt to do so as much as possible without fetching, because by the end of a query (or after some parts have completed), there are generally only very few rows to fetch, thereby speeding up the process. This is unlike other databases (like MongoDB® (a trademark of The MongoDB Company, Inc.)) that fetch after the first index use, without utilizing other indexes to finish the WHERE condition.

Moreover, in actual use case scenarios, some queries require only fetch-less operations. One specific example involves analytics, such as the query:
SELECT COUNT(*) FROM table WHERE lastname="Smith";

This only has to find the # of IDs with the lastname "Smith", which is easy for an index and requires no fetching from raw storage.

In particular, this allows for various optimizations, since it is assumed that a collection scan (a scan of all the rows of a data collection) is not available. Collection/table scans are often used in databases where a query is rather complex, and the database assumes most or all of the rows will be touched by the query at some step. However, the index system designed according to the present embodiment is usually much faster than doing a raw collection scan due to, e.g., the OpIters being very efficient, and in some cases executing similar to how a raw scan would work, but without having to load inefficient raw data, and instead using efficient indexes.

In addition to this, "Reactive Operators", described below, may also be implemented. The basic principle behind "Reactive Operators" is to have operators (like AND, OR, BETWEEN, etc.) be reactive, allowing them to combine and melt/"react" with each other to create a specialized operator that has a special, efficient implementation. In some cases, these operators can cancel each other out. In this sense, the operators are more deterministic, which some may view as a version of a "Query Planner," a popular term used in other databases to describe the processing and optimization of an inputted user query.

One principle behind Reactive Operators is to replace Query Planning with something more deterministic. Parts of a query are broken up into operators in the engine. These operators are part of the basic operations set of the engine. A Reactive Operator is an operator that can "react" to an adjacent operator to form a new Compound Operator. This leads to an advantage whereby certain combinations of operators allow for special algorithm optimizations. So by making the operation tree "Reactive", the query is caused to "melt"/"react" together to form a more optimized "query path", as illustrated in FIG. 11.

Figure 11:
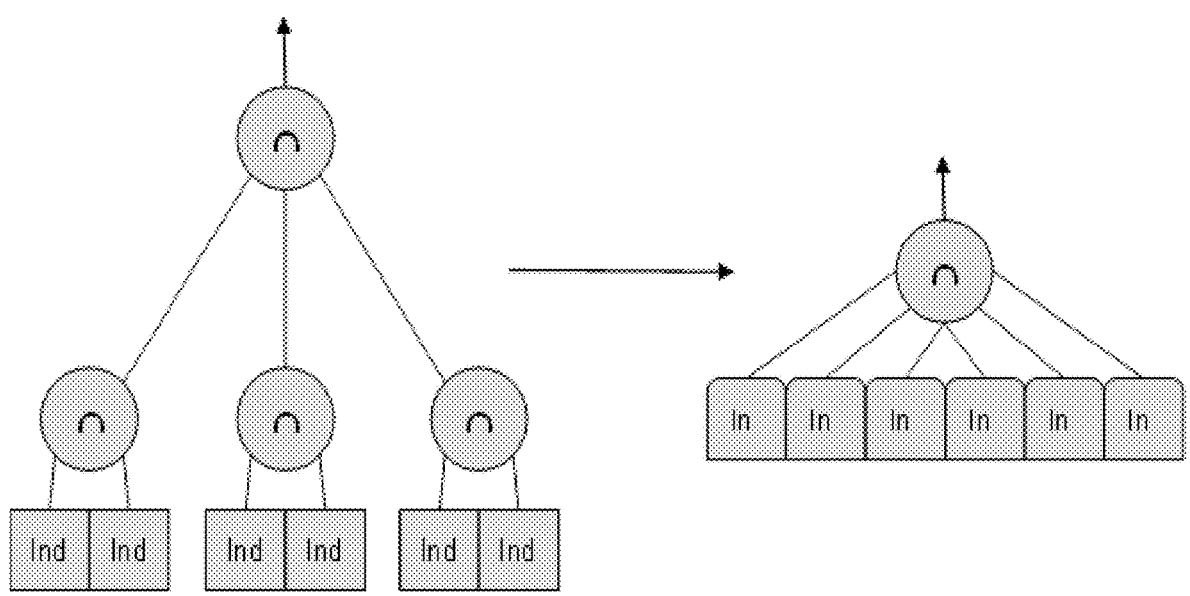
FIG. 11 is a diagram illustrating the formation of more optimized query paths through use of Reactive Operators.

As shown in FIG. 11, the formation of more optimized query paths through use of Reactive Operators yields a more deterministic query path. Not only does this replace the query planner, but it also allows transfer of knowledge between operators enabling identification of exactly what data to keep and what not to keep. This is useful to free up resources, but also to know what fields are necessary to the final answer, which can reduce the amount of fetching needed, and to allow for indexes to tack on key info so as to avoid fetches.

It will be recognized by those of ordinary skill that these operators are a form of Generic Iterators. This allows use of abstractions to create specialized iterators. One example is how the performance of index scans, where otherwise there might be a need to convert the scan into a SortedSet (or set of IDs, or sorted set of IDs) before using it with other indexes. With this new operator system, it becomes possible to avoid that conversion step and instead execute a specialized algorithm to combine the two different types of info. This provides an advantage in that there is a reduction in the number of execution steps (speedup), is a reduction in RAM usage, and is a reduction in the number of allocations (speedup).

In combination with indexes according to the embodiment and Fetch-less Operations, a further optimization becomes possible, whereby index stats and other bits may be used to quickly complete an analytical query, like a count query. Since this information is already available, it becomes possible to more quickly complete the query. For example:
SELECT COUNT(*) FROM lastname="Smith";

An index on "lastname" will resolve the above to the key "Smith". Since the ChainTree stores the # of IDs in the SortedSet located in the ChainBlock it points to, this can be used to resolve this query.

Once a query is finished being computed, the OpEngine 205 sends the results back to message handler 204, where the results are aggregated and sent back to the master 202, where the results from the various slaves that have been involved in handling this query are then aggregated before being sent back to the user 208 who sent the query. The results may be used or incorporated in, e.g., a measurement tool such as analytics tool 209, an application 210, or may be forwarded to DexterityDB conversion layer 211 for conversion to another data format.

The concept of shards will now be described in more detail. Specifically, a shard is a slice of a collection or table in a database. Each slave can have multiple shards of a collection. Using shards allows the system to perform operations on parallel hardware. One idea is to divide the data in a collection among multiple slave servers, each of which then may split its portion of the data up further into shards based on how many of the threads can be executed in parallel on that slave.

This configuration makes it possible to insert, remove, and execute queries in parallel without the need to handle locking systems, because the system typically executes only on as many shards as there are threads in parallel, although exceptions are possible as described above in connection with the relation between the number of threads and the number of CPU cores: The slave machine is responsible for determining the optimal number of shards based on primarily the number of threads that can be executed at once, and then secondly based on trying to avoid formation of large shards (e.g., the maximum number of rows in a Shard is set to 1 million in one example embodiment, which helps with keeping write performance up).

In other embodiments, there may be fewer rows per Shard, such as 65536 rows per Shard instead of 1 million. By reducing the number of rows per Shard, an ItemID can be represented by 2 bytes instead of 4 bytes. This doubles the number of ItemIDs that can fit into a page block, reducing I/O usage. Fewer rows per Shard increases the number of Shards to represent the same dataset. This allows the engine to more evenly spread data across hardware threads, and more easily parallelize operations evenly on smaller datasets. Fewer rows per Shard may in some instances also enable other optimizations, like pre-allocating memory for OpEngine operations due to the small Shard sizes, which can improve performance by 2× compared to allocating each time a Shard is traversed. It may also be possible to shrink other structures knowing that Shards can only be so big, such as a reduction in pointer sizes and so forth. This reduction in storage and ID space allows loading of more useful data per I/O operation, making the CPU spend more time rather than the disk. In fact, experience shows increased performance on harddrives as compared to SSDs; whereas harddrives are normally orders of magnitude slower than SSDs, the method described herein results in harddrives being only 3× slower compared to SSDs with only up to 3× slower execution compared to SSDs. Indeed, experimental evidence demonstrates that the slower performance of harddrives compared with SSDs is not even an I/O bottleneck but rather a disk bandwidth bottleneck. It should be understood that databases typically suffer on harddrives due to I/O, but embodiments described herein can handle so much in so little amount of space now to reduce I/O impact and RAM usage per query.

Another benefit of the smaller Shard sizes is the deviation in performance as the dataset scales in size is now more linear. With larger Shard sizes, there may be more of a performance hit due to the larger ChainTree sizes (due to O(m*log n) traversal algorithms where m is the number of shards, n is the number of rows per Shard, such that, as more rows are in each shard, the more time is taken to traverse the dataset). Instead the "m" in O(m*log n) becomes more of a factor when Shard sizes are smaller, allowing to scale essentially linearly with less deviation in performance.

By setting a row limit on shard size, it is also possible to define the maximum integer size for Local IDs for the shards (described in detail below). In one example, the Local ID size is set to 4 bytes, but in other cases it is possible to limit the size to 2 bytes, and each shard is limited to 65536 rows in either case. The smaller 2-byte limit would allow for more fine-tuning of thread usage, and reduce the storage used by indexes by half. It also doubles the number of IDs that each ChainBlock can hold, reducing by half the number of input/output operations needed to scan a slice, which can help the performance even further.

The Local IDs mentioned above are local to the shard.

In some embodiments, an ID denoting data desired by an external apparatus may be implemented as a "RouteID". A Route ID contains a SlaveID, ShardID, and ItemID, which together uniquely identify where the item is located. Thus, the RouteID contains routing information (the machine, and shard it is in), similar to a mailing address. One reason to use a RouteID in lieu of a more conventional Global ID is because when multiple datasets are joined together, there is a huge amount of network bandwidth and messages needed to achieve the join. In particular, the machines don't know where the data is located in the server cluster, so they send messages to every machine to find where the data is. This becomes a bottleneck for operations like JOIN (combining columns across tables), UNION (combining rows across tables), etc. RouteIDs, by contrast, point exactly to where the row/object is located.

The RouteID should only be used and accessed from internally in the system. A RouteID is never exposed to users, or machines that connect to the engine's server cluster. This is because RouteIDs can change value during a rebalance, which the cluster is optimized to handle, in the sense that it can update all backend metadata that uses those RouteIDs (usually for pointing to foreign data) to instead use the new values. But if the RouteID was to be exposed to a user, it adds extra complexity to the logic of the user's application. Therefore, RouteIDs are never directly exposed outside of the DexterityDB system, and instead it is proxied by a Cursor. The Cursor is a proxy to a ResultSet. The ResultSet is stored within the system, and a Cursor is used by an external party to fetch items/data from a ResultSet, without ever having to touch RouteIDs directly.

In general, RouteIDs could be considered (very loosely) like how the IPv4 and IPv6 system works in networking. Each machine (item) gets a unique ID that generally is assigned based on how to locate it in the network cluster (slave cluster). Those IPs (RouteIDs) can change on the items as they move around and connect to other network nodes (shards), but are not exposed to the end user, and instead managed through routing tables.

The RouteID is useful in rebalancing (i.e., moving data between different locations in order to optimize space), when items reference each other. Rebalancing often changes the RouteID, since it moves the item to another shard and/or slave. To facilitate usage of the RouteIDs in rebalancing, in one embodiment, a Foreign Key Index system (also called a JOIN index) is added to the engine to speed up cross dataset operations. Essentially these indexes are a mapping from Keys to RouteIDs. The RouteIDs act as a routing table, so the OpEngine knows which machine contains the info it needs, which can drastically reduce network bandwidth. Moreover, it is easier to co-locate data (locate data from different protection groups on the same disk or tape storage), with the goal of minimizing network traffic. In that regard, these JOIN indexes only need to be updated when items are rebalanced.

Because of the above, RouteIDs make it easier to support JOIN operators in the database engine, and have several other significant benefits to performance, with very little in the way of unwanted side effects. Another benefit is that the full RouteID does not need to be stored with the item. There is only a need to store (or implicitly infer) the ItemID, and the RouteID is simply the composite of the SlaveID, ShardID and ItemID. Accordingly, there is less worry about a storage size increase resulting from the requirements of handling the IDs.

In other embodiments, however, a Global ID may be used in the system, and thus a Global ID is converted to the Local ID (and the remainder of this description will refer to embodiments that employ Global IDs). When a Global ID denoting data desired by an external apparatus is obtained by parsing an incoming query, it is converted to a Local ID before execution of any other operations. This is done by means of a structure that is simply a single ChainTree to map a Global ID to a Local ID.

However, in order to do an SQL JOIN operation (combining columns) between shards, and be able to maintain uniqueness of row IDs, it is necessary to ensure that each Global ID is truly unique.

As context, certain database implementations use universally unique IDs (UUIDs) and globally unique IDs (GUIDs), which are randomly assigned, sometimes based on the current time and machine ID, but IDs of these types still are subject to a small chance of collisions occurring (i.e., two identical IDs being created by chance). The big benefit of UUIDs is that shards don't have to coordinate assigning Global IDs, since they have a system in place to generate unique IDs, such that the chances of collisions are small enough to be negligible in normal cases. Nonetheless, there is still a problem in that the chance for collisions increases as the number of rows increases. This is problematic in, e.g., a massive dataset, because there is a non-zero chance of collision, which for some industries is unacceptable. Another problem is that this random assignment of IDs based on time, random numbers, or hardware IDs does not use all available ID numbers, wasting precious ID space and causing the Global IDs to be large (e.g., 8-16 bytes).

Instead of these conventional approaches, certain embodiments designate a server as a master of a cluster of multiple slave machines. The master is in charge of maintaining a ledger of all the slaves, and how the collections are balanced (distributed) across the shards (high-level metadata). The master is also in charge of issuing batches of Global IDs to slaves. It is thereby possible to assign incremental IDs (i.e., a set of IDs forming a sequence without gaps in the sequence), but in batches, to each slave, so that instead of assigning one ID at a time, the master allocates a range of Global IDs (e.g., a range, or set of consecutive Global IDs) to each slave. Each slave is then allowed to use IDs in that range to assign to the rows that get inserted into data set portions on that slave, so that the master doesn't need to spend time on that task, and the slaves don't need to be synced with each other. If a slave is running out of new IDs in its Global ID space, it requests another batch from the master. This may prove much cheaper (with significant to huge performance gains and smaller storage requirements), tends to maximize Global ID space, and may help ensure no collisions by using a central issuing server.

Indeed, for the approach described in the foregoing paragraph, there is not always a need for a master. A master may be used in some of the simpler implementations. A masterless approach might involve one slave being designated as the ID issuer, or this responsibility may be shared between slaves.

Because of the design of the message handler 204, ThreadPool 212, OpEngine 205 and shards, it is ordinarily possible to utilize all of the cores of the CPU on a slave machine. This of course tends to help maximize performance.

When all of the threads are done executing, they place a merge job into the ThreadPool 212, which handles the task of merging the results together.

Figure 3:
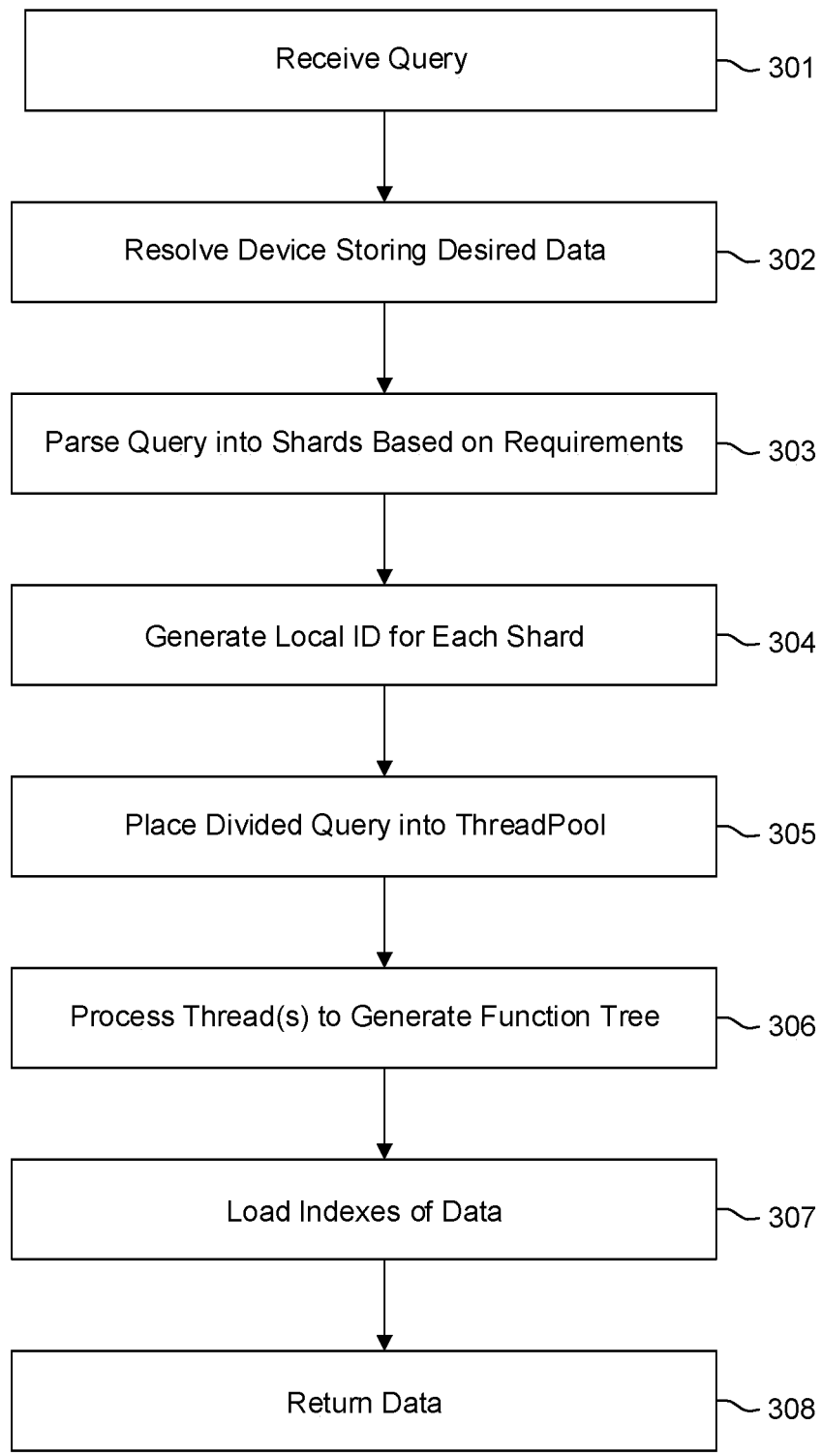
FIG. 3 is a flow diagram for explaining a database query process according to an example embodiment.

FIG. 3 is a flow diagram for explaining a database query process according to an example embodiment.

Briefly, in FIG. 3, a query to a database is processed. A query seeking data from the database is received. The identity of a slave machine which stores the requested data is determined, and the query is parsed to identify one or more shards containing potentially relevant data at the slave machine. In one example embodiment, the shards are predefined, e.g., when data is inserted into a slave machine, as discussed above, and are removed when they contain no data. As described above, rows inside the shard are assigned respective fixed-size Local IDs. Tasks corresponding to each shard are placed into a thread pool, and the threads are processed using the respective Local IDs to obtain the requested data.

In more detail, in step 301, a query is received, to obtain data from the database. The query may be, for example, input at a connected proprietary terminal, or transmitted via a network from another computer. In one example, the user types in a query to a search field at a computer, and the resulting text is converted into a query for the database. Of course, numerous other variations are possible.

In step 302, the system determines which device physically stores the data desired by the query. In one example, a computer server acting as a master device uses a message handler (as described above) to decipher the query and identify the relevant slave device(s) through, e.g., consulting a ledger, table, or registry.

In step 303, the query is parsed to identify one or more shards, based on the requirements of the query. Thus, for example, the message handler might identify which shards of data need to be accessed by the query, in a case in which the requested data is broken up across multiple slaves. The message handler can thereby maximize the processing power by, e.g., maintaining the same number of shards as there are CPU cores on each involved slave server, so that the shards can be processed concurrently.

In more detail, shards are a physical slice of a full collection of items. When a dataset is inserted into the engine, it splits the dataset in two steps.

First, the full dataset is split into subsets based on how the data is being distributed across all the slave machines. This step need not (and generally does not) divide the dataset equally amongst the slaves. Instead, it divides them so if the user should query against the dataset afterwards, each slave will take roughly the same amount of time to complete the execution of the query. In some cases, limits posed by the maximum capacity of each slave's storage devices may prevent complete attainment of this criterion in dividing the data. For example, assuming 3 slaves (and also assuming they have the same CPU architectures, and have infinite storage (so as not to trigger the bounds limitation):

Slave 1 with 8 cores @ 2.0 GHz each (16 Giga-Clock-Cycles (GCC))
Slave 2 with 4 cores @ 2.5 GHz each (10 GCC)
Slave 3 with 2 cores @ 3.0 GHz each (6 GCC)
For a total of 32 GCC across all Slaves.

In this case, Slave 1 will get 50% of the dataset (16 GCC/32 GCC), Slave 2 gets 31.25% of the dataset (10 GCC/32 GCC), and Slave 3 gets 18.75% of the dataset (6 GCC/32 GCC). When the dataset is queried, on average the slaves should take the same amount of time because the dataset was split up based on the compute capacity of each slave.

Storage capacity is the other factor involved in how to distribute the data. While it tries to distribute the data by bytes equivalent to the percentage above, it is possible for a fast slave to have too little storage capacity to support the set it was being handed. In such a case, the storage capacity may force those percentages to change (if more data were allotted to one slave than the storage capacity of that device can accommodate, there is a risk of losing some of the data being allocated to that slave, since once the storage capacity has been used up there is simply no place to put the rest).

In the second step, after the subsets are sent to the slaves, each slave machine distributes its subset across the shards it contains. A slave has at least one shard, and tries to keep the number of shards per dataset equal to the number of cores the machine has, although exceptions are possible as described above in connection with the relation between the number of threads and the number of CPU cores. For Slave 1, keeping the number of shards equal to the number of cores means each dataset should have around 8 shards, to match the 8 cores that are in the machine. This is done to maximize the amount of computing power that can be used by that dataset on the slave, but this rule is not necessarily strictly followed. So, the subset allotted to Slave 1 is 50% of the full database, which then gets distributed across the 8 shards equally (because each core should be equivalent in computing power when on the same machine). It is possible that shards can be unequal in size, and in those cases the slave tries to balance the shards, to make them more nearly equal. It is also possible to have fewer or more than 8 shards. For example, for small datasets, slaves may choose to have 1 or 2 shards, even if the machine has more than that number of cores. This is because splitting data incurs an overhead cost in that the results of a query across each shard have to be merged together before being sent to the user. If a shard has 0 items, the slave will usually remove it, or in some cases rebalance by moving data from other shards into that empty shard. For very large datasets, it is likely the slave will choose to use more than 8 shards. In one example, a shard can contain a maximum of 1 million rows and/or items (although this could be changed, to, e.g., 65536 to reduce Local ID storage size). The limit is designed to keep query time per shard in the single-digit millisecond range, and has the added benefit of setting the Local ID size (32-bit). If all 8 shards are full, the slave will create more shards even though this means not strictly following the core count rule, which is a further example of an exception to this rule. The single-digit millisecond design may be used so that the query reaches a point in time at which it allows other queries to run, rather than blocking those queries from executing. A core on a slave may then execute a query on multiple shards before getting the final result.

This shard design makes it easy to parallelize queries, and to divide data based on computing capacity to maximize the performance and scalability of the engine, and specifically to maximize performance of processing and responding to the queries in the database.

In step 304, rows inside the shard are each assigned a respective fixed-size Local ID. Local IDs used for rows and objects are also not exposed past the shard; that is, these Local IDs are used internally in the OpEngine when executing a query on the shard, which has the benefit of storage and performance optimizations, but are not contained in the query responses from the various shards. These Local IDs are never exposed to the end user (unlike Global IDs). In certain embodiments, the slave is not even aware of the Local IDs, and the shards manage those IDs internally. This processing is described in more detail below with respect to FIG. 4.

In step 305, divided threads are placed into a thread pool for processing. In particular, once the shards are identified, the message handler spawns one task per shard and adds the task to the thread pool's job queue, which is, e.g., a first-in-first-out job queue. The thread pool can simultaneously process the same number of tasks as there are CPU cores on the slave device.

In step 306, queries are processed to generate a function tree. For example, each task may be run using the OpEngine 205 (described above), and the function tree is traversed to access the requested data and/or perform requested tasks. Threads may then take the function tree and execute it to access data or perform tasks.

In step 307, indexes for the requested data are loaded into memory. The indexing structure is described in more detail below. Each index contains keys and values from only one column in the table/collection, so it is ordinarily possible to speed up data retrieval. For example, it's possible when combining multiple indexes to avoid running a scan. (Scans usually occur in known databases when the indexes span multiple columns.)

In step 308, the requested data is returned. Thus, for example, the OpEngine in a slave device might send results for a query back to the message handler, which can aggregate results for the master device, which can in turn aggregate results from multiple slave devices before sending the final result to the user.

Figure 4:
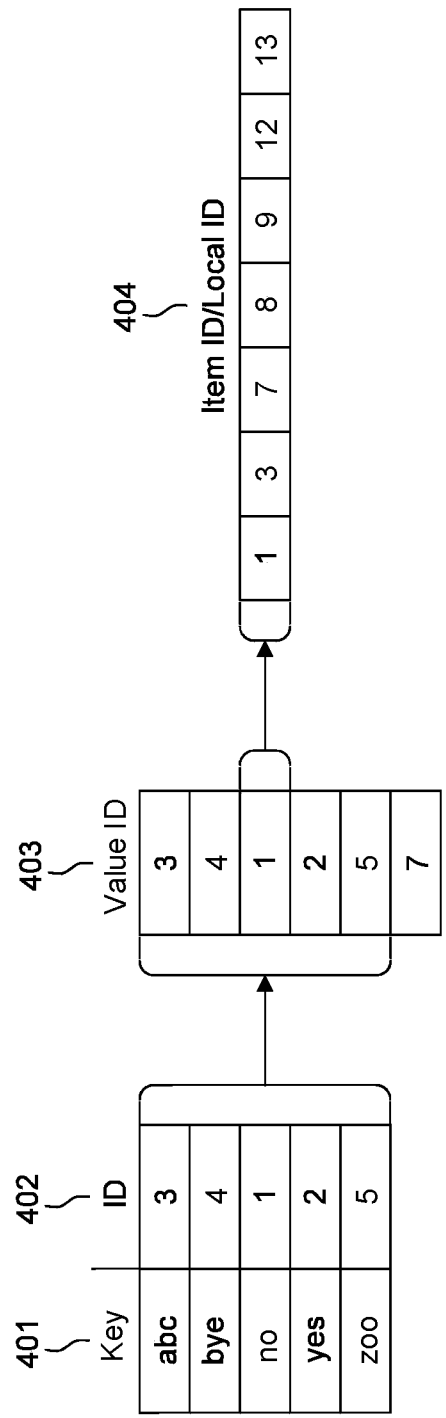
FIG. 4 is a view for explaining Local IDs according to an example embodiment. The term Local ID is sometimes referred to herein as "Item ID".

FIG. 4 is a view for explaining local IDs according to an example embodiment.

In database design, most databases eventually must address hitting the maximum capacity of rows or objects. Apart from such reasons as running out of storage capacity on a HDD or SSD, a common problem with running out of room arises from the design of the database, and specifically, from the way in which it uniquely assigns an ID to each row or object. A new database technology will often assign a 32-bit or 64-bit integer ID to a new row. However, use of 32-bit IDs only allows about 4 billion rows to be in the database. When that number is exceeded, the only possible next step is to assign the next entry (row) a 64-bit number, and adjust all the other IDs to 64-bit format (which takes time, since the adjustment must be made to each one of 4 billion rows).

On the other hand, if the database is being used with only small sets of data, having 64-bit IDs is inefficient since it doubles the size of the storage that IDs take up, as compared to using 32-bit IDs. Certain databases go ahead and just assign a 64-bit ID to each row or object, and ignore the lost potential space savings. Again, however, the number of items might exceed the 64-bit limit. It may be unlikely that many data sets will exceed the number of IDs a 64-bit integer can hold, but it's often overlooked that each row must be assigned a unique ID, and no ID can be reused (thus, even if rows have been deleted from the database, the IDs of those rows are not available to be assigned to any other row). That means that even if a row is removed, its ID can never be used again, since users and applications might otherwise confuse the new row for the old row that had previously had the same ID; this might occur, for example, if the ID of the old row were being stored outside the database for later reference, to be fetched later.

To avoid this kind of data confusion, IDs are always unique to every new row, and IDs are never reassigned. A given ID may exist in multiple tables, but that is workable because the table names, in addition to the ID, provide a way of uniquely identifying the row that is meant.

In write-heavy datasets that change their rows often, it is common for the system to go through one thousand times or more IDs than what is currently being used in the dataset. This makes it easy to eventually run out of IDs if they can never be reallocated. One way modern databases get around this is through a Global ID system, either using a UUID/GUID, or a variable length ID.

Variable length IDs also are somewhat common. These are often known as BigInts, or BigIDs. They normally start at 32 bits and only increase to 64-bit length when the next ID number exceeds what can be written using 32 bits. However, the algorithms which use BigIDs don't then have to change all of 4 billion rows with the 32-bit BigIDs because algorithms are provided in the database to account for the variability in the ID storage size. The ID size increases by 32 bits whenever the maximum number is reached. MongoDB® (a trademark of The MongoDB Company, Inc.) uses a 96-bit ObjectID system that is slightly different (https://docs.mongodb.com/manual/reference/method/ObjectId/).

While these all in some way fix the issue, they do have some disadvantages. First, the non-incremental IDs (UUID, GUID, ObjectID) do not make efficient use of the entire ID space. In other words, some IDs are skipped and never allocated for one reason or another. For example, rather than assigning IDs to 4 billion rows using 32-bit IDs, it could end up using only 100 million of the potential 32-bit IDs. This wastes precious space.

Second, the variable length IDs (BigIDs) require additional computing time, since the algorithms are obligated to make provision for handling variable sized IDs. In addition, any ID larger than 64 bits can make algorithms slower because most computers' registers only hold up to 64-bit values; to handle IDs that are 65-bit to 128-bit length may require sometimes three to five times more computation, and even more for larger numbers of bits. The drastic increase in computation is because the computer must emulate the handling of a register larger than what the computer may natively handle.

Third, incremental IDs (BigIDs) require cores on servers, and each slave, to sync up their IDs to prevent collision. This can cause huge performance issues as rows are inserted, because only one single CPU core on a single slave can be allowed to insert rows at a time (to prevent ID collisions). Moreover, in some inefficient cases, this single CPU core might be the only one in the whole server cluster that is allowed to insert rows. In either case, this drastically reduces the ability to parallelize insertion.

In contrast, certain embodiments of the present disclosure described herein are designed to tackle large data sets, and allow the database engine to ingest massive data sets. Moreover, it is desirable to utilize every ID possible so as not to waste ID space, while not suffering from the incremental ID lock issue, all while minimizing the amount of storage space required for these IDs. In particular, certain embodiments add an additional layer of internal IDs that are never exposed outside of the database, but are used to maximize the benefits that are sought.

The new layer comprises internal IDs called LocalIDs, also known as Item IDs in the Route ID format. These IDs are only unique to a particular field of an object on a particular shard, and do not need to be unique across all shards, slaves, or the entire collection (or multiple collections). This allows the system to remain unique with each row of data, because each row is designated to exist on a specific shard, and is assigned both a GlobalID for reference across the whole engine, and a LocalID when being used inside of a Shard. Current databases store (key, GlobalID) pairs (most use pointers instead of GlobalID) in indexes. Since GlobalIDs are variable length, they incur performance penalties when comparing two, and require extra logic to traverse the indexes to account for the variable sizes. By converting each variable-length GlobalID to a fixed-size LocalID, it is possible to address this.

Meanwhile, items don't need to be assigned a RouteID in a RouteID system, only in a GlobalID system. So, by switching to RouteIDs, it is possible to avoid this issue. The tradeoff is there is now a need to sync up any JOIN indexes if items are rebalanced. Luckily, items that are used in JOIN indexes are usually favored to be co-located on the same slave to reduce network traffic. So, it is often likely that for most datasets that the RouteIDs being balanced are on the same server, or same two servers. Since the RouteIDs are never exposed to the user, there is little concern about reassigning IDs causing issues.

According to this embodiment, a shard is responsible for managing the LocalIDs that point to each row of data the shard contains.

A shard, being a slice of the full dataset, contains raw data of a part of the dataset, rather than referring to data elsewhere. A shard contains raw data (the raw form of the item or row, as given by the user), and indexes (as described herein). The data of a shard is stored on a persistent disk (a hard drive or other storage device). In one example, memory map (MMap) technology is used to cache the data on the disk into memory. In this regard, since the index is stored on a SSD or HDD, the structure is designed to work with a MMap (Memory-Mapped) library. These MMap libraries are usually built into the operating system, in order to maximize the efficiency of the paging table on the CPU. The reason MMap files are useful for database engines is that they allow a program to use file data as if it is in memory, and the operating system caches the pages that the program recently accessed into memory. By virtue of caching parts of the file in memory, subsequent operations get the speed of volatile RAM, while having the non-volatility of a SSD or HDD. This means that if the computer is turned off, the data is still intact. In addition, MMap is designed to minimize the number of I/O operations to a SSD or HDD by grouping like I/O requests and requesting more data than is being accessed in case it is needed. Since most file systems are designed to store data in blocks of 4 KB-16 KB, MMap requests data in blocks of those sizes. That range also happens to be capable of efficiently being loaded into CPU cache layers (L1, L2, and L3), which is where MMap data is sometimes loaded into while it is processed. The library also automatically syncs the data with the SSD or HDD, so the program need not manage how much is cached in memory so as not to impede other applications. This prevents or reduces out-of-memory errors, too, because the operating system treats memory mapped RAM as swappable with the storage device, and as programs need more RAM it will offload old data to the disk.

The structures that data is stored in are designed to be zero-copy (meaning there is no need to copy and parse them to execute operations on them, rather it is possible to interact with the cached data directly in memory, and in the same format as on the disk). In some embodiments, a "Virtual File System" may be created so that multiple files can be combined together. This is to reduce the number of files that might otherwise result due to the increased number of index data types, and the reduced Shard size causing more files.

This also may help with reducing unused disk space, since each file takes up at least a certain amount of storage (16 KB-64 KB) even if it does not fill that much, so combining them reduces that amount of unused space.

Figure 13:
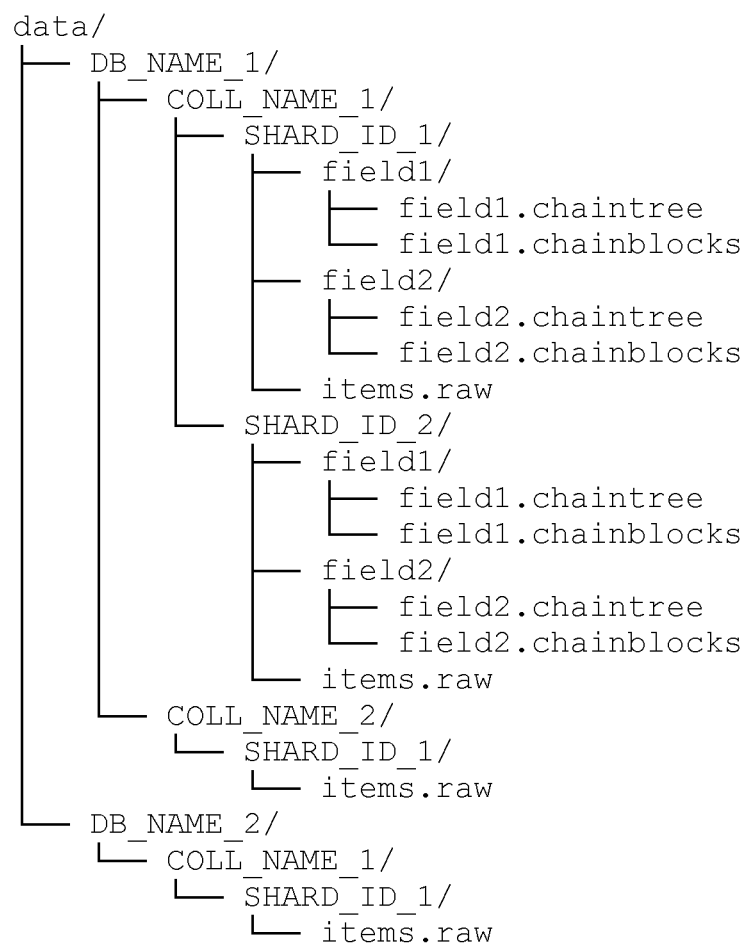
FIG. 13 is a diagram illustrating an example of a folder structure for a shard.

In other embodiments, the raw data and indexes are stored in separate files, and a shard may have a folder structure as illustrated in FIG. 13.

Referring to FIG. 13, the data folder is where the database is stored. The DB_NAME is a database instance (allowing multiple instances to run on the same hardware). The COLL_NAME is a collection (aka dataset) in the database instance. Inside of the collection are the shards. Each shard has an items.raw file (which contains the raw item data), and folders that represent the indexes. The field1 and field2 are indexes, broken into two files denoting the chaintree and chainblocks structures. Each file is a MMapped file, and manipulated through the OS's MMap library.

The shard and OpEngine are the only levels of the engine's architecture that interact with the local IDs. When a GlobalID is passed to the OpEngine 205, OpEngine 205 converts it to a local ID for use in query execution. When the OpEngine 205 is ready to send back the results of querying on a shard, it converts all local IDs back to GlobalIDs. Thus, one may obtain the performance benefits of using fixed-size integers, something CPUs in computers are really good and efficient at working with, while keeping all references internally in the indexes on the shard, and the raw storage, small because they are 32-bit local IDs, rather than 64-bit or larger Global IDs. Route IDs can also be used here, and see similar benefits relative to use of only the local ID/Item ID portion. The only restriction of this system is that the number of rows in a shard cannot exceed the local ID 32-bit limit (or the 16-bit limit in 65536 shard sizes).

For context, the structure of a query will now be described more fully. When a query is sent to a database, there are often several keywords sent. For example, a basic SQL query is shown below:
SELECT COUNT(*) FROM people WHERE age>25 AND age<30 AND name<"smith"

The keywords, other than the reserved keywords like SELECT, COUNT, FROM, WHERE, and AND, are called keys. These keys help identify what table to access, what fields to search, and what values to compare against. Normally in a database engine, keys are used in both the row storage, and the indexes. While numbers are usually fixed in size, strings and custom value types are usually variable in size. As discussed above with reference to GlobalIDs, this variability in size can affect performance dramatically. Moreover, comparing ValueKeys can be expensive in computing resources and time when not using fixed-sized integers. Floating point values can take two to twenty times longer to compare than integers, while strings or custom values can take even longer.
SELECT COUNT(*) FROM people WHERE name<"smith"

When looking for names that are alphabetically less than "smith", most databases look at the key part of the pair using binary search on an index (if available), until they find the first instance of "smith". Then, they iterate over the binary search tree until they reach the beginning of the index, and return the number of results. However, the procedure can often become much more complex than that. For example, if the following query is run:
SELECT COUNT(*) FROM people WHERE name<"smith" AND name>"Johnson"

a range is performed between "johnson" and "smith". The algorithm then changes, and starts by finding the first pair after "johnson", and keeps on iterating through all the nodes in the binary search tree index until it finds either the end of the index, or the first instance of "smith". At each node it touches, the algorithm compares the pair's ValueKey to the "smith" ValueKey. In addition to all of this, binary search trees take a lot of time to iterate from one node to the next, and can sometimes cause cache misses, where the CPU must pause to wait for the memory of the new node.

Modern databases get around these performance issues by using a "B+Tree" (an n-array tree with a variable but often large number of children per node). These often reduce the number of input/output per operations and the chances of cache misses dramatically. Some databases also perform a special "between" operation behind the scenes where they find the first element to include in the results, and then find the last element. Then they iterate between the first and last element without having to compare keys since they know everything in-between meets the comparison criteria, and instead just have to compare pointers. This gets more complicated as additional comparisons are made on the same field, but generally helps to drastically reduce the overhead of key comparisons. However, using these trees and comparison of keys can still be costly, and the organization of the indexes adds more clock cycles of computation in order to iterate through.

Accordingly, certain embodiments address this by using KeyID optimization. Instead of comparing ValueKeys at the index operation level, some embodiments according to the present invention compare small integers called KeyIDs. Instead of dealing with the overhead of nodes in a B-Tree, arrays of KeyIDs are used, which allows for the most optimal format for iteration, bringing it down to only 5-8 clock cycles per ID on current x86-64 architectures (although the clock cycles may be different on other architectures). Since nodes and pointers aren't used, less space is needed per item in the tree, saving some space (since IDs are only 4 bytes or less), but it also allows more IDs to fit in CPU caches, which helps maximize performance. This optimization is similar to the LocalID optimization. When a query comes in, every value/key is converted into a KeyID, so it only has to compare a limited number of times before the rows that match that partial expression are found.

According to certain embodiments, this conversion between Key and KeyID occurs before any computation takes place in a query, which allows for optimization of the indexes to utilize these fixed LocalIDs and KeyIDs for the entire computation. It allows for creation of a single index type, optimized for IDs, and may reduce or remove concerns about comparison optimizations and data-type optimizations at the Key→KeyID conversion level.

Returning now to FIG. 4, FIG. 4 is a diagram of the logical representation of the index structure, using inverted indexes. Each index contains keys and values from only one column on the table/collection. On the left side is the conversion table for converting Keys (401) to KeyIDs (402). When a new value or key comes in, it is mapped to its respective ID. Each ID can then be used in what is called the VI structure, which maps the ValueID 403 (or KeyID) to a sorted array of ItemIDs 404 (also known as local IDs). This is a simple, abstract view of what the index structure does.

The ValueIDs 403 are sorted by the sorted order of Keys/Values. The ItemIDs 404 are sorted to make set theory calculations on the order of O(n). This is because an intersection or union can be performed quickly on a sorted array, while an unsorted array requires some form of sorting to optimally perform index intersections or unions. In addition to the VI structure, there is an inverse one called the IV structure. In the IV structure, the system inputs an ItemID and outputs all of the ValueIDs (or KeyIDs) on that field of the item. This is useful in more complex operations like sorts, joins, and aggregations by allowing indexes to be used to speed up those calculations, while only needing one index for each field used in the query.

Figure 5:
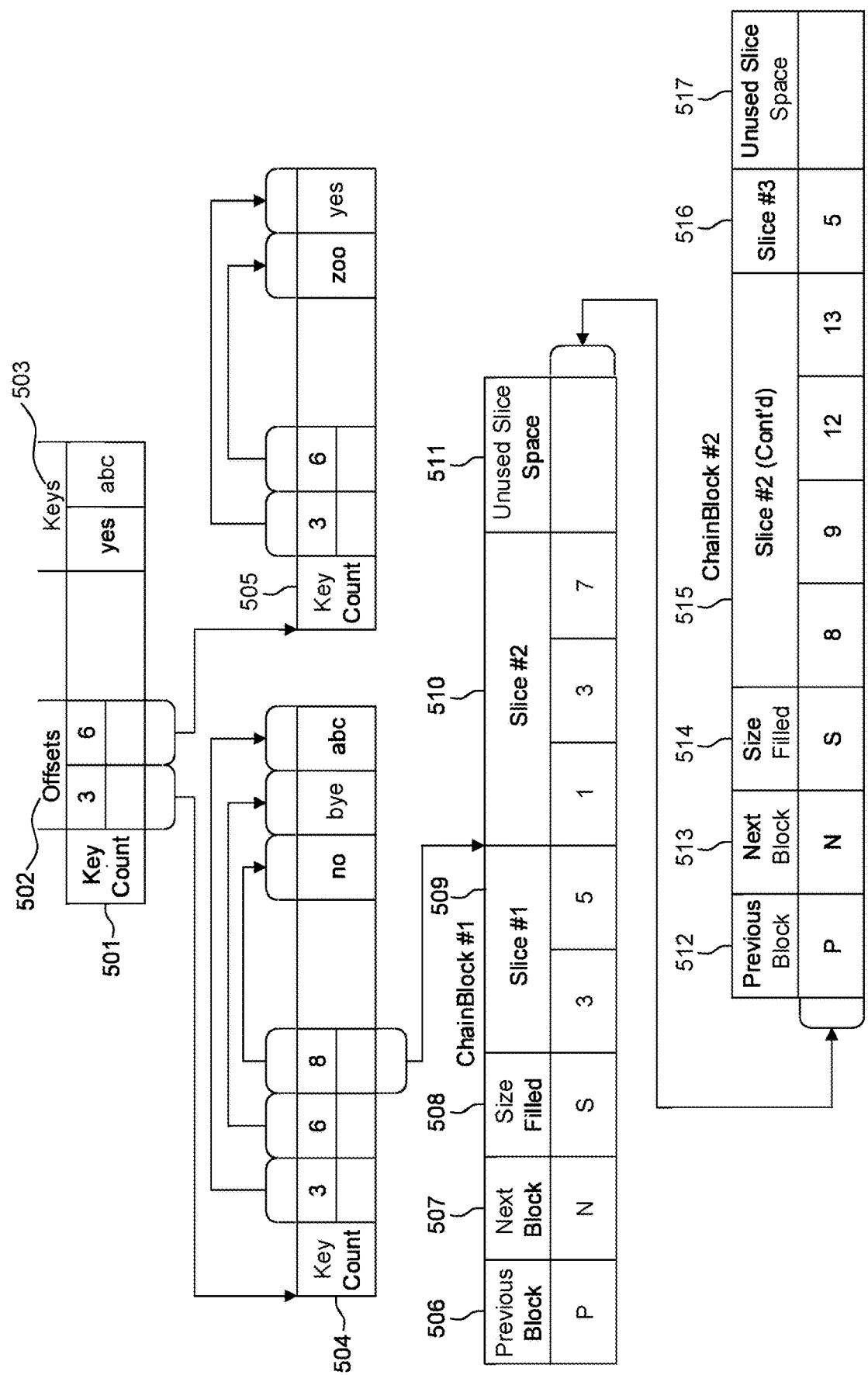
FIG. 5 is a view for explaining a physical data structure according to an example embodiment.

FIG. 5 is a view for explaining a physical data structure according to an example embodiment.

In that regard, the physical structure uses a form of a B+Tree for the indexes, but the structure is actually a B+Tree that points into a doubly-linked list of KeyID arrays. This can also be called an unrolled linked-list. However, both the KeyID and the reference to the start of the ItemID list are stored in the ChainBlocks.

As can be seen from FIG. 5, the physical data structure is a bit different in terms of organization compared to the logical diagram, for several reasons.

The first major reason is that data in a file only exists in one dimension. It is not possible to store a table like the Key→KeyID in a file without serializing it to make it into a linear data structure. A second reason is that due to variable length keys and values, it is not easy to determine the location of a specific piece of data being searched for. This index system is designed to be fast, and tries to avoid scanning a file for the data it is looking for.

In addition to all of this, it is beneficial for the database structure to support zero-copy philosophy. One principle is to organize the data in the file, exactly in the right format for use with algorithms in memory. In this way, the system does not have to parse the data being loaded from the file, eliminating the need for a parser that could slow down operation. It also avoids the need for allocating memory when loading indexes or data into memory, because the system simply points to the MMap location, which would then be efficiently cached in RAM thanks to the operating system's MMap library. In addition to that, all structures are designed to fit in 4 KB blocks, and aligned by 4 KB, improving efficiency in I/O operations when the MMap library is loading or saving new data (because most modern implementations work with 4 KB block operations and only load data aligned by 4 KB).

As shown in FIG. 5, key count 501 stores a number of keys which the "leaf" of the tree refers to, as well as offsets 502 which indicate an offset from, e.g., the beginning of a data block, as well as keys 503, which contain the real values that would be found on that indexed field in a table.

The offsets 502, in turn, point to additional leaves 504 and 505, which repeat the structure. In the example shown here, the offset in leaf 504 can be used to point to ChainBlocks #1 and #2, in turn.

In some embodiments, the traversal of the tree can be terminated when the right key is found, rather than duplicating the key in the tree.

In addition, the offset in the variable sized keys points to where the key is stored in the current block. This permits the offsets and pointers to be searched through using binary search techniques, because they then have a fixed size (an Offset is a 16-bit number, while the pointer to the next block is 64 bits). Variable length keys are 8 or more bits, which makes it hard to do a quick search in the current node for where the right key is, or where to traverse to the next, because with variable length keys one must do an O(n) search, while doing offsets permits one to do one of only O(log$_2$(n)). The pointers tell where the next blocks are. Everything in the storage system can be based on 4 KB blocks, so if there are more keys than fit in 4 KB, one solution is to expand to other blocks and use offsets to get to them.

ChainBlock #1 comprises previous block field 506, next block field 507, size field 508, slice 509, slice 510, and unused slice space 511. ChainBlock #2 comprises previous block field 512, next block field 513, size field 514, slice 515, slice 516, and unused slice space 517.

Figure 6:
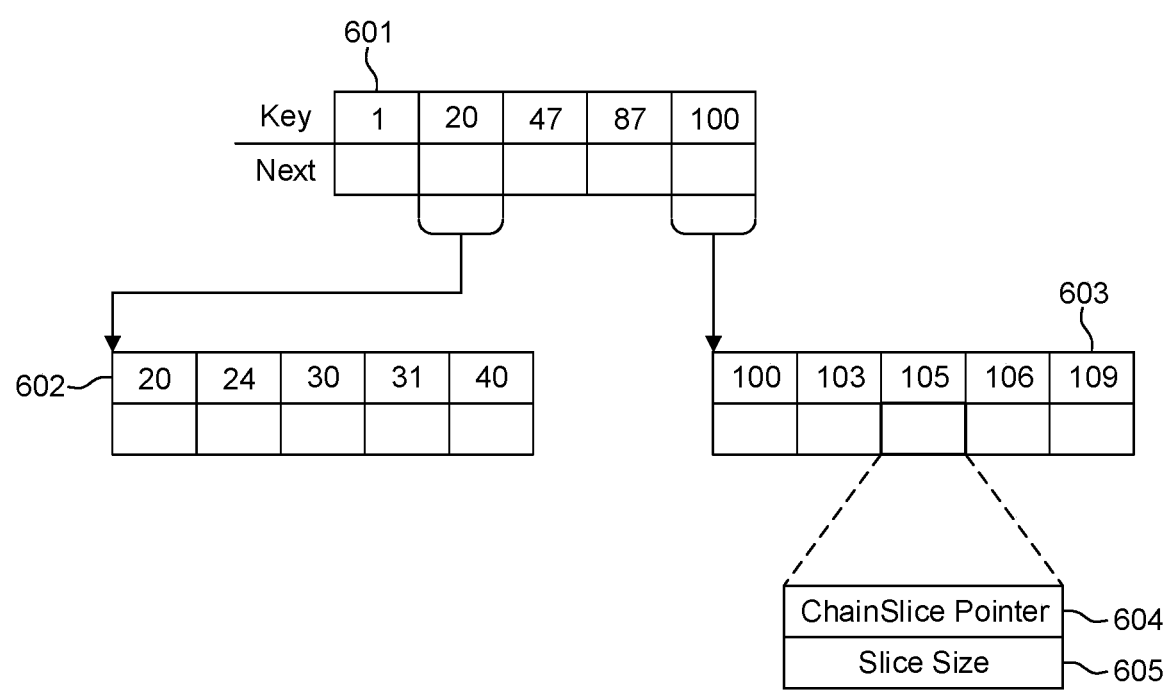
FIG. 6 is a view for explaining an index structure according to an example embodiment.

FIG. 6 is a view for explaining an index structure according to an example embodiment.

The Index Structure is broken into two parts—ChainTree 601 and ChainBlocks 602 and 603 ( . . . and so on). The ChainTree 601 is responsible for mapping a Key to a KeyID. ChainTrees and ChainBlocks are described in greater detail below, but before such explanation, a modified embodiment will be described first.

According to this modified embodiment, referred to herein as "Super-Sharding", multiple ChainTrees of multiple Shards are combined together into one, to take advantage of minimizing key duplication across Shards, and to reduce the number of tree traversals when dealing with a large number of Shards due to the fewer number of rows in Shards (65536 in this embodiment). That way for X number of Shards, they share the same tree traversal (done one time by one thread), and then they split out across CPU threads to use their respective SortedSets. One reason for this optimization is because decreasing the number of rows per shard increases the number of total shards, which increases the number of ChainTrees, and it can be expensive to traverse the entire collection as more traversals must occur. By having one ChainTree shared between all or some shards, the total number of tree traversals is reduced across the collection, thereby solving one of the disadvantages of using smaller shard sizes. More files are required, but this is not a disadvantage, as the Virtual File System, above, solves issues relating to the number of files.

According to still further modified embodiments, referred to herein as "Sub-Sharding", the "Shards" are treated as "Sub-Shards", and they share ChainBlocks between them. The SortedSets between the Shards share the same area of the ChainBlocks structure. This works by merging the SortedSets by interleaving them. For example, to interleave two SortedSets so that they share the same area of the ChainBlocks, set A takes their first element, then set B takes their first element, then set A takes their second element, then set B takes their second element, and so on. The focus is improving locality of the SortedSets across sub-shards. This potentially enables use of SIMD operations to go through multiple Shards at the same time on one CPU thread, thereby going through the data more quickly. Also, since the SortedSets are co-located in the ChainBlocks, they are pulled together into the CPU cache, reducing the number of cache misses and improving the SIMD performance.

Technically, Super-Sharding and Sub-Sharding differ in principle in that one tries to take advantage of SIMD operations to increase data throughput, whereas the other tries to reduce ChainTree overhead and minimize duplicated storage.

Reverting again to the embodiment depicted in FIG. 6, as previously mentioned, the Index Structure is broken into two parts—ChainTree 601 and ChainBlocks 602 and 603 ( . . . and so on), and ChainTree 601 is normally responsible for mapping a Key to a KeyID. In this embodiment, the mapping is resolved to a ChainSlice Pointer 604. Logically this is the same, but this avoids the need for an additional table to map the ID to a pointer location where a ChainSlice starts.

In more detail, a ChainSlice is a sequence of consecutive ascending local IDs stored in one or more ChainBlocks. The ChainBlocks have no physical way to represent where ChainSlices begin or end. They simply act as an ID container (in certain embodiments, for example, a ChainBlock can hold 1019 local IDs). The ChainBlock has no knowledge of what a slice is, or where the slices are. The ChainSlice Pointer 604 in FIG. 6 is a physical pointer to where a slice begins, and that pointer is associated with a Size 605, which is the number of IDs in the slice. A slice is consecutive starting at the location the ChainSlice Pointer references. A ChainBlock might not hold the entire slice. It is in certain embodiments possible for slices to have as few as only 1 ID, up to 1 million IDs. Since a ChainBlock can only hold 1019 IDs, this slice (if larger than that) is split across ChainBlocks (using the ChainBlock's Next Pointer). Even if a ChainBlock is not full, it is still possible that the slice may exist across plural blocks. This commonly occurs during insertions of IDs, where blocks are "split" to make it easier to insert an ID in a slice. When a block is split, it keeps the left (first) half of its IDs, while the right (second) half gets copied to a new ChainBlock. The ChainBlocks then update their next/previous pointers appropriately to maintain the chain ordering (where the new block becomes the next block after the one that was split).

Thus, for example, slice 404 in FIG. 4 is a sorted set of IDs (one logical structure for ChainSlices). Put another way, ChainSlices are a logical structure that exist in the ChainBlocks (using ChainSlice pointers and sizes from the ChainTree to build a ChainSlice iterator). ChainBlocks are physical containers to allocate IDs and maintain slice ordering in a 1-dimensional file, while allowing for random inserts and removals at speeds quicker than shifting all the data over in the file.

There are two types of ChainTrees—one for fixed-sized keys, and another for variable-length keys. The fixed-sized implementation is shown in FIG. 6 and is a special optimization for the Key→KeyID when using fixed-sized values. While DexterityDB Engine 201 does not require checks on the keys for every iteration, it still needs to map the keys to the inverted index, but this system requires far fewer checks than others. Examples of a fixed-sized value are standard programming integers (8-bit, 16-bit, 32-bit, etc.). The key values of the above structure are a part of the index. Each key is associated with a ChainSlice pointer 604 and slice size 605. This points to where in the ChainBlocks the associated slice for that Key can be found, and how many local IDs are in that slice.

Figure 7:
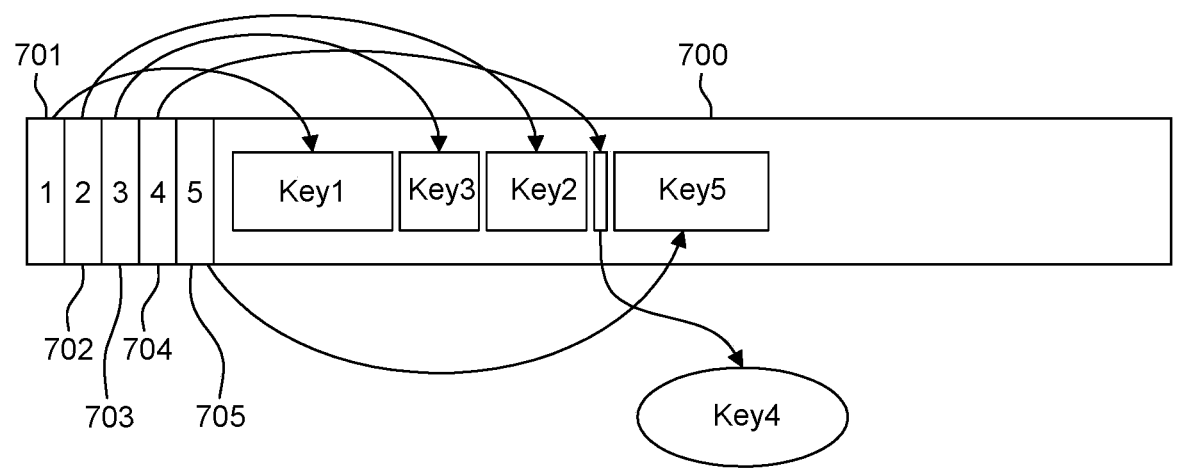
FIG. 7 is a view for explaining keys and chain trees according to an example embodiment.

FIG. 7 is a view for explaining keys and ChainTrees according to certain example embodiments.

In particular, FIG. 7 illustrates a disadvantage the inventors discovered in conventional technologies. In the example shown in FIG. 7, the first part (701, 702, 703, 704 and 705) stores offsets and sizes to the keys, allowing the engine to store these keys in the nodes 700. When a new key is inserted, however, the keys may need to be shifted over to allow for the offset and size of the latest key (key #6) in the beginning list. In addition to that, the offset and size start to take up a sizeable amount of space in the node. These are needed, though, because the offset and size and the keys lists are appended, and so it is not possible to know where the keys start and stop. In contrast, the example arrangement shown in FIG. 5 and FIG. 6 can ordinarily reduce or avoid such uncertainties.

Figure 8:
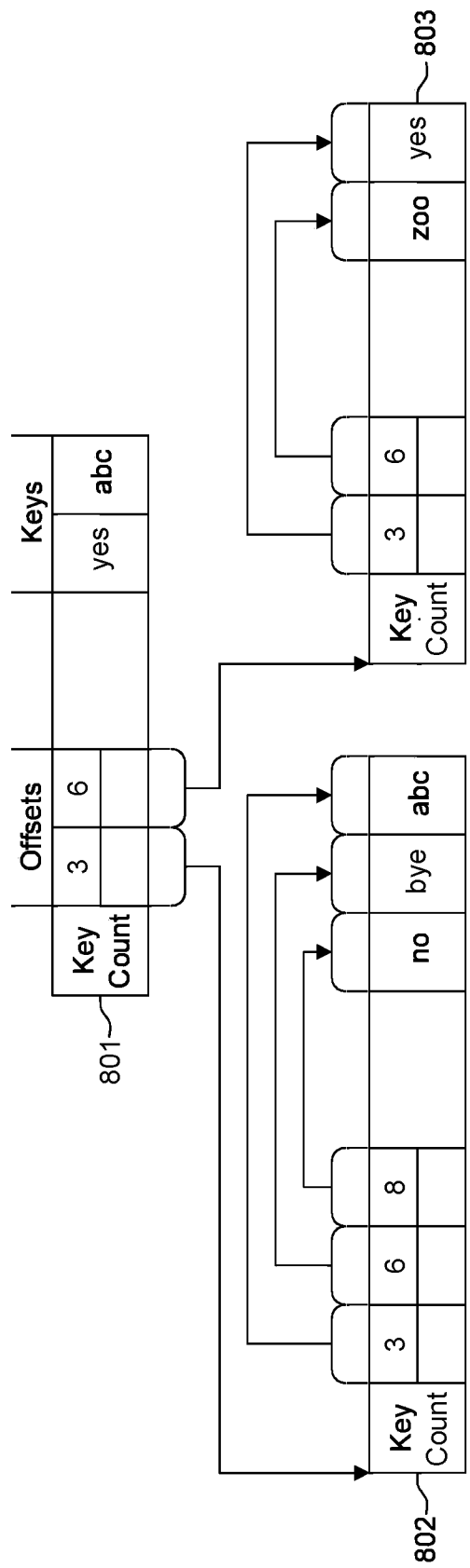
FIG. 8 is a view for explaining variable length tree nodes according to an example embodiment.

FIG. 8 is a view for explaining variable length tree nodes according to an example embodiment.

This embodiment eliminates the need for size and makes it much more efficient with fewer rearrangements by making the key list grow from right to left, instead of left to right. This permits building the key list and appending a new latest key (e.g., key #6 in the example of FIG. 7) without having to move all of the keys. According to embodiments using such a feature, the offsets grow from left to right, while the keys are added right to left. Key size can be computed from the offsets (and is relatively inexpensive), allowing for utilization of more space in the node. Since the offsets are fixed-sized integers, the ChainSlice Pointers and Sizes can also be stored with them, since those are also fixed size. This allows for a binary search on the node by picking the middle offset, comparing the key, etc. This preserves the $O(\log_2 n)$ look-up performance that is obtained with the fixed-sized version.

In particular, as shown in FIG. 8, the ChainTree 801 maintains keys in sorted order. This makes it optimal for range queries, which permit finding the start and end points in the ChainBlocks (802, 803, etc.), allowing for quick iteration over a wide range without performing many comparisons.

The structure in FIG. 8 is an example of the ChainBlocks. The ChainSlice pointers from the ChainTree 801 will point to the start of one of the slices 802, 803, etc. in the ChainBlocks. The Slice Sizes that are paired with the pointers in the ChainTree provide enough information to identify where the slices end when iterating over them.

The ChainBlock system is essentially a doubly-linked list of fixed-sized arrays of fixed-sized IDs (also called an unrolled doubly-linked list). This format allows for rapid iteration over the slices and blocks, while offering a balance with insertion performance. Normal linked lists could have been used since they are fast for adding and removing nodes, where it is one ID per node, but each node needs a 'next' pointer, and even worse, each node could be located in a different page block in the file, which can cause more cache misses. This extra space usage and these cache misses impact performance drastically. The reason the ChainBlock is a doubly-linked list is that when an ID is removed, there is a check to see if two blocks can be merged to save space. Generally, it is more efficient to check both the next and previous blocks to do that. Not all of the space in a block is utilized, like a normal B+Tree. The nodes are maintained to use at least half (50%) of the space of each block, which balances space usage with insertion/remove and read performance. Other embodiments may utilize 80-90% of the space, as this might in some circumstances result in a better balance in performance. More specifically, the better space efficiency reduces I/O and maximizes what can be done with each I/O, which often provides better performance benefits than that provided by the existence of more free space. Such benefits may accrue in insertion/removal cases too, and not only in read cases.

The logical structure shown and the physical structure can be much different from what is shown, however. Slices can span multiple ChainBlocks. ChainBlocks aren't shown in the logical diagrams. The reason they exist at the physical level is to align the data to the page size for MMap purposes, as described above. ChainBlocks also can be used to specify the boundaries for the linked list node sizes. By sharing the blocks among slices, it is possible to save space.

IDs in the slices are maintained in sorted order. This makes it optimal for set theory algorithms on sorted array sets. Intersections, unions, and other operations involve only $O(n)$ calculations, as opposed to tree intersections (which are $O(n*\log_2 n)$) or other algorithms, and each iteration in $O(n)$ uses fewer clock cycles than used by an iteration in O(n*log$_2$ n) operations, making it even faster. The slices in the full ChainBlock linked list are maintained in key-sorted order. This makes it optimal for range queries by allowing iteration between like values. This is done by taking the lower bound of the range and getting the starting position using the ChainTree 801, and then getting the upper bound. Since the slices are known to be in key-sorted order, iterating over the lower to upper bound should cover all the desired IDs. This reduces the need to merge multiple sets and perform a large number of key comparisons.

Since ChainBlocks store only IDs, rather than pairs of IDs and keys, significant space is saved keeping the key in the ChainTree and not duplicating keys. Since less space is used, more IDs can be fit into the block, minimizing the input/output needed to load the relevant parts of the indexes. Since the slice consists of all indexes that match those keys, a simplified algorithm can be created that just iterates over the slice, returning the ID until it reaches the end of the slice, rather than checking each pair to verify that the index matches the key.

Some embodiments may also employ interval or run-length encoding of ID sets, also referred to herein as Entropy Skip Compression (ESC). This permits combining patterns of IDs into an interval, and then computing intersections and unions on those patterns/intervals. This saves both on storage and on computation. For storage, there is no need to store 50 consecutive IDs, and instead just a couple of numbers can be stored to denote the range of IDs. For computation, intersections and unions can quickly be performed on intervals as if they were just single IDs. This effectively groups IDs together as one "iteration" of the O(n*log$_2$ n) operations discussed above. So, for the same or slightly more clock cycles per iteration, operations on dozens more IDs can be achieved at once.

Figure 12:
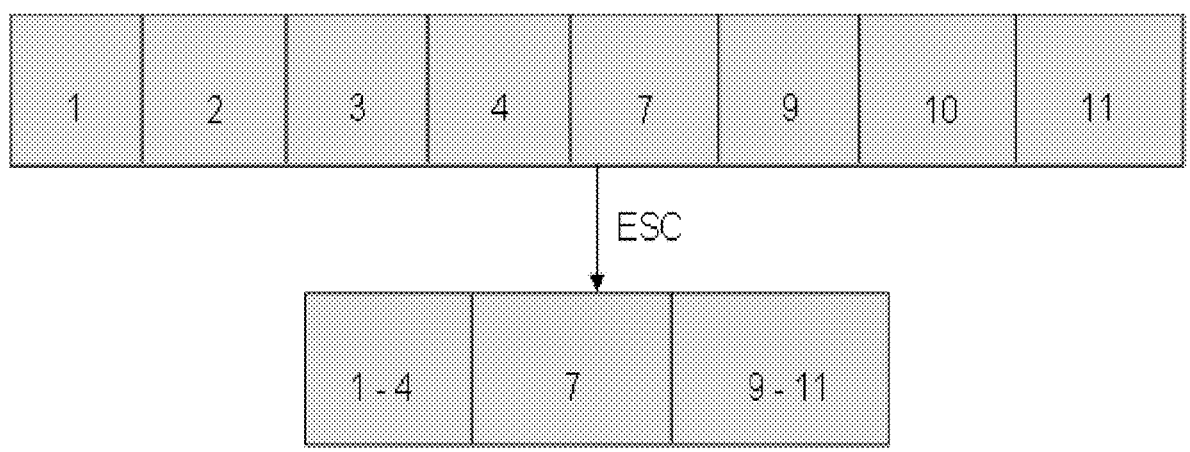
FIG. 12 is a diagram illustrating interval or run-length encoding of ID sets so they can be compressed based on gaps in IDS and contiguous IDs.

FIG. 12 is a diagram illustrating interval or run-length encoding of ID sets so they can be compressed based on gaps in IDs and contiguous IDs. Basically, interval or run-length encoding of ID sets changes how the SortedSets work so they can be compressed based on the gaps and contiguous IDs. This works similar to how Interval Trees work, but instead on sorted interval arrays, allowing for even further performance benefits. Theoretically this can improve performance in real world applications where many rows share similar data, and in many cases can improve performance quite drastically; for example, in one interval it might be possible to perform an intersection or union of 1000s of IDs.

Such an arrangement works better when there is an active agent defragging the shards so that it can maximize the ESC. This happens by trying to get similar rows to have adjacent IDs.

Another way to improve this is to also use run-length encoding or other compression techniques to reduce storage. Reducing storage reduces the amount of data that needs to be loaded in memory, thereby being more cache efficient since it fits better in CPU cache and RAM. This improves performance, reducing the chance that the storage medium is the bottleneck.

The benefits of these features can be drastic on both storage and performance. Such benefits can be extended by auto-balancing shards (almost like defragmenting) to try to maximize the compression ratio by making items/rows that share similar keys to be stored in the same shard, and by reordering the ItemIDs to get the intervals to cover more ID space if reordering helps.

In this regard, it should be understood that in considering suitable compression and optimization techniques, preference should be given to techniques that do not require decompression of the data to perform intersections and unions. Most compression algorithms require the program to decompress the data to be able to operate on it. In contrast, run-length encoding and interval sets do not require decompression since intersections and unions can be performed directly on the compressed/optimized data.

The ChainBlock system also provides performance improvements when iterating.

Specifically, B-trees are a little more expensive to traverse between nodes(about 10-40 clock cycles per jump), while a linked list at the bottom allows for simple iteration, which requires much fewer clock cycles (only 3-7 clock cycles needed).

Certain embodiments also use a simple allocation system for blocks. For purposes of simplicity, the system will be referred to as "AllocStack". AllocStack exists on all of the MMap files, and makes it easy to maintain a stack of blocks that have been collected for recycling. As blocks are emptied, their references are pushed onto the AllocStack. When a new block is needed, a reference is popped off of the AllocStack. The AllocStack's blocks (called AllocBlocks) are organized very similar to a ChainBlock, except it only has a 'previous block', and not a 'next block' pointer. The ID slices are instead switched out for a stack of pointers. If an AllocBlock is full when a new block reference is pushed, it recycles the block reference as an AllocBlock, and uses it as the new top AllocBlock on the AllocStack. When an AllocBlock is empty, it recycles itself as a block reference when something needs a new block, using the 'previous' AllocBlock as the new top block in the AllocStack.

This system makes it easy to maintain all of the blocks that are free to be reused, so that the system need not scan the file for free blocks, or allocate new space in the MMap file (unless no blocks are free). This is normally very fast both for pushing and popping block references, and often only takes a few clock cycles. Converting the referenced block to the block type needed is quick, because most of the block types are designed to perform quick clear operations (they don't need the block zeroed in order to be recycled, and instead only a couple of fields need to be set).

The DexterityDB engine of this embodiment may also include forward indexes, or what are here sometimes termed reverse-indexes. This allows the conversion of a local ID back to GlobalID, and KeyID back to Key. These are all fixed-sized ChainTrees. These indexes can also to generate raw results, without having to touch the raw storage engine. This makes the system faster by not having to load full rows into memory and then removing the fields not requested by the client application.

Some embodiments may employ IDTrees which resolve an ID to the raw row/item it refers to in the Shard. An IDTree is a specialized index not exposed to the user of the engine, and it is essentially a lookup table, allowing resolution of an ItemID/LocalID to a raw row in O(1) time, without even having to store the ID in the IDTree. It only has to store the raw data, making it very compact and enabling retrieval and fetching of 100s of millions of rows per second per CPU core.

The general use case of the index is with three functions: (1) insert an ID with the value "Key", (2) retrieve all IDs with the value Key, and (3) remove an ID with the value Key.

Retrieving a list of IDs that match a key is simple: the system looks up the key on the ChainTree and returns an iterator composed of the ChainSlice pointer and size. Insertion works by retrieving the ChainSlice pointer and size from the ChainTree based on the Key, with some edge cases: If the Key doesn't exist, it uses the next greatest Key's location as the insertion point. If no Key is greater than the Key being inserted, then the location after the previous Key slice's end location is used. If no Key exists in ChainTree, the insertion is made at the beginning of the ChainBlocks List.

In addition to that, the system also retrieves the end pointer of the slice being inserted into. This pointer is retrieved by getting the starting location of the next slice and subtracting the position by one, or by using the pointer to the end of the ChainBlock linked list. Once that pointer is retrieved, there is a check to see if the ID being inserted should be inserted at the end of the slice. If not, the whole ChainSlice is scanned until the inserted position is found. The slice is always in ascending ID sorted order.

Examples of operations when the insertion position is found will be described.

One situation is when inserting into a block that is full, and the insertion position is before the mid-point. In that case, the block is split into two blocks, and the upper half is moved into the new block. Then, the data between the insertion point and the mid-point is moved over by one, and the ID is inserted at the insertion point.

Another situation might resemble the previous example, but in a case where the insertion point is after the mid-point. In that case also the block is split into two, but the ID is inserted into the new block.

Along the same lines, if the insertion point is at the mid-point, the upper half is moved to the new block, but ID is inserted at the mid-point.

If the block is not full, and the insertion point is at the end of the used part of the block, nothing has to be moved around.

If the block is not full, and the insertion point is before the end of the used part of the block, the insertion point needs to be moved over to fit the new ID.

After the above operations are handled in the ChainBlock, the ChainSlice pointers in the ChainTree are updated to reflect the new locations of the slices they point to, in case some of the starting locations could have been moved.

Removing an ID is similar to insertion, but instead of splitting and shifting data to the right, data is shifted to the left, and blocks that can be merged are merged. Blocks that can be merged are those whose sizes added together is equal to or less than the maximum size of one block.

As mentioned above, it is possible to get a list of IDs that match a range of values. This is done by taking the lower bound of the range and getting the starting position using the ChainTree, and then getting the upper bound. Since the slices are known to be in key-sorted order, iterating over the range from the lower to upper bound covers all the IDs that are required. This eliminates the need to merge multiple sets and perform a large number of key comparisons. Thus, a range iterator can be constructed from the lower bound slice to the upper bound slice. This is more efficient than conventional indexes which compare each KeyID while traversing the tree to make sure that the system is still in the range.

An example of how a query may work in certain embodiments is below:
SELECT COUNT(*) FROM people WHERE age>25 AND age<30 AND name="smith"

To perform this, in one example, an SQL Driver parses the query into low level API calls.

The low level API works as follows:
Load Range of index "age" between 25 exclusive and 30 exclusive.
Load Equal of index "name" where it equals "smith".
Perform an AND intersection between the loaded range and the loaded equal.
Return the count of the # of IDs in the result.

The raw storage engine (e.g., data storage engine 206) works very similarly to the index structure. It uses a ChainTree to map local IDs to slice locations in ChainBlocks. But instead of storing IDs in the ChainBlocks, the embodiment stores the raw data of the row/document. In this case, it is possible to store Javascript Object Notation (JSON) strings, a very flexible and popular format. This raw storage engine allows for fast insertion, removal, and retrieval of raw data, but not as performant as indexes (about 2-3 times slower). It should be understood, however, that embodiments using the ChainTree and ChainBlock system is agnostic to the data structure of the objects. As such, these embodiments are not limited to JSON, and can also use other arrangements for a data interchange format such as BSON (Binary JSON), like MongoDB, or use MySQL's raw row format, or even a self-defined special-purpose binary format. The raw storage engine does not care what the bytes represent, and instead relies on the parser system to handle that.

Other embodiments may also use a feature referred to herein as "Template Schema Compression", TSC. This specifically applies to the raw storage engine, because even though it is agnostic to what the bytes mean, there may be embodiments that use a self-defined special-purpose binary format, specifically focused on optimizing the schema used for each row. For example, some datasets may use an unsigned 32-bit integer for identifying relationships. However, a lot of the numbers exist in the 16-bit range. With TSC, the engine automatically optimizes those rows that are only using the 16-bit range. The database will create two "sub-collections", one where a 32-bit schema exists for those in an outlier range, while it will have a 16-bit schema for the ones in the smaller range. This is all done seamlessly, and without user input. It specifically figures out the smallest variable type to store the data not only to save space, but to possibly save some computation. DBAs (Database Administrators) spend a lot of time on tedious optimization tasks, trying to optimize their datasets. TSC automates the process by figuring out the best data type for that specific row. A table/collection of rows may then use different data types for that, but when sent back to the user, it will be treated as the schema the DBA gave. Saving 2 bytes for each row on only one column across billions of rows add up quickly; consider, for example, saving 2 bytes for each row on the dozens of columns usually in a table.

So, the "Schema" part of the TSC name comes from focusing on optimizing the schema of each row. And in fact, a table may have multiple schemas behind the scenes as a result. The "Template" part of the TSC name comes from building templates of the schemas. It removes the column names. When dealing with document-based storage, since columns can be added and removed, and the data is "schema-less", the column names are stored with the raw data. This adds significant unnecessary overhead when multiple rows/items/documents share the same column names. So, the template removes the columns, and defines the schema of the row and how data is laid out in binary format. In principle, it is not that a collection has multiple schemas, but instead multiple Template Schemas. When the engine is used in a document-based database, TSC auto-optimizes rows that share similar schemas. For both document-based and table-based databases, TSC uses data type tricks behind the scenes to reduce the overhead of some rows/documents that may only need a smaller data type or does not need a float and instead can use an integer (which is more computationally efficient).

TSC finds particular utility in a NoSQL document world, where the structure of the documents can change over time, or even at the same time. To be able to parse these documents to understand their structure takes time, and the added storage overhead of identifying what each column name is and what data type it has cannot only more than double the storage, but use significantly more processing time as well. TSC in this scenario provides the principle of automatically identifying the schema (aka the structures) of each document, see which ones share the same structures, and then create a template. This template acts as an optimized binary version of this schema, reducing storage usage and creating optimal versions of the documents, thereby eliminating the overhead of dynamic schema algorithms that happen in NoSQL. In addition to this, this automated system can automatically figure out what data types are best to optimize the storage of the schema, eliminating the need for a DBA to undertake such tasks.

The present invention, or any part(s) or function(s) thereof can be implemented using hardware, software, or a combination thereof, and can be implemented in one or more mobile devices or other processing systems. To the extent that manipulations performed by the present invention were referred to in terms of human operation, no such capability of a human operator is necessary, or desirable in most cases, in any of the operations described herein which form part of the present invention. Rather, the operations described herein are machine operations. Useful machines for performing the operations of the present invention include mobile devices, smartphones, personal digital assistants (PDAs) or similar devices.

Figure 9:
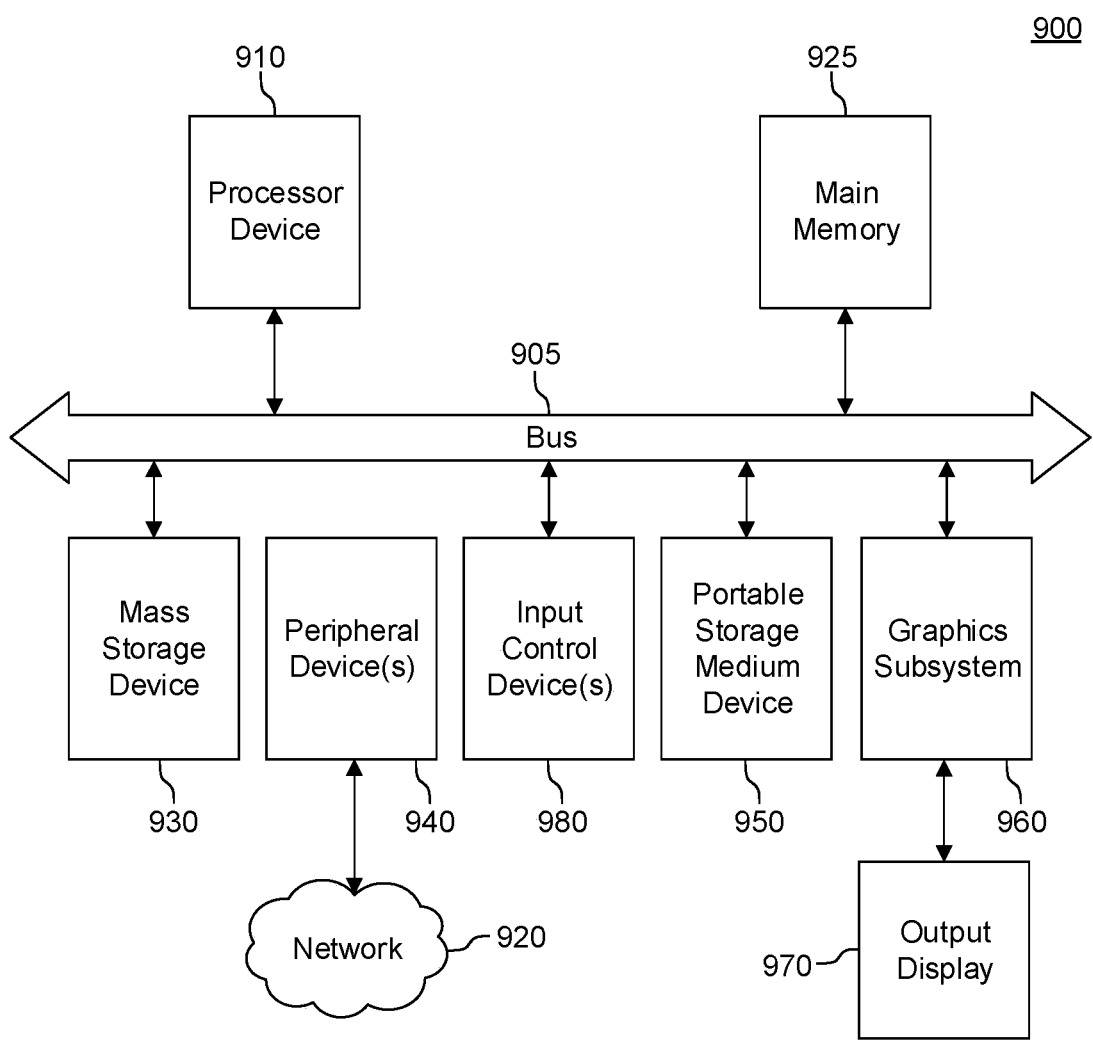
FIG. 9 is an architecture diagram of a processing system in accordance with an example embodiment described herein.

In one embodiment, the invention is directed toward one or more systems capable of carrying out the functionality described herein. FIG. 9 is a block diagram of a general and/or special purpose computer 900, which may be a general and/or special purpose computing device, in accordance with some of the example embodiments of the invention. The computer 900 may be, for example, a consumer device, a consumer computer, a client computer and/or a server computer, among other things.

The computer 900 may include without limitation a processor device 910, a main memory 925, and an interconnect bus 905. The processor device 910 may include without limitation a single microprocessor, or may include a plurality of microprocessors for configuring the computer 900 as a multi-processor system. The main memory 925 stores, among other things, instructions and/or data for execution by the processor device 910. The main memory 925 may include banks of dynamic random access memory (DRAM), as well as cache memory.

The computer 900 may further include a mass storage device 930, peripheral device(s) 940, portable non-transitory storage medium device(s) 950, input control device(s) 980, a graphics subsystem 960, and/or an output display interface 970. For explanatory purposes, all components in the computer 900 are shown in FIG. 9 as being coupled via the bus 905. However, the computer 900 is not so limited. Devices of the computer 900 may be coupled via one or more data transport means. For example, the processor device 910 and/or the main memory 925 may be coupled via a local microprocessor bus. The mass storage device 930, peripheral device(s) 940, portable storage medium device(s) 950, and/or graphics subsystem 960 may be coupled via one or more input/output (I/O) buses. The mass storage device 930 may be a nonvolatile storage device for storing data and/or instructions for use by the processor device 910. The mass storage device 930 may be implemented, for example, with a magnetic disk drive or an optical disk drive. In a software embodiment, the mass storage device 930 is configured for loading contents of the mass storage device 930 into the main memory 925.

The portable storage medium device 950 operates in conjunction with a nonvolatile portable storage medium, such as, for example, a compact disc read only memory (CD-ROM), to input and output data and code to and from the computer 900. In some embodiments, the software for storing information may be stored on a portable storage medium, and may be inputted into the computer 900 via the portable storage medium device 950. The peripheral device(s) 940 may include any type of computer support device, such as, for example, an input/output (I/O) interface configured to add additional functionality to the computer 900. For example, the peripheral device(s) 940 may include a network interface card for interfacing the computer 900 with a network 920.

The input control device(s) 980 provide a portion of the consumer interface for a consumer of the computer 900. The input control device(s) 980 may include a keypad and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the computer 900 may include the graphics subsystem 960 and the output display 970. The output display 970 may include a cathode ray tube (CRT) display and/or a liquid crystal display (LCD). The graphics subsystem 960 receives textual and graphical information, and processes the information for output to the output display 970.

Each component of the computer 900 may represent a broad category of a computer component of a general and/or special purpose computer. Components of the computer 900 are not limited to the specific implementations provided here.

The example embodiments described above such as, for example, the systems and procedures depicted in or discussed in connection with FIGS. 1 to 8, or any part or function thereof, may be implemented by using hardware, software or a combination of the two. The implementation may be in one or more computers or other processing systems. While manipulations performed by these example embodiments may have been referred to in terms commonly associated with mental operations performed by a human operator, no human operator is needed to perform any of the operations described herein. In other words, the operations may be completely implemented with machine operations. Useful machines for performing the operation of the example embodiments presented herein include general purpose digital computers or similar devices.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a non-transitory storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD or CD-ROM, a micro drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the non-transitory computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further include software for performing example aspects of the invention, as described above.

Included in the programming and/or software of the general and/or special purpose computer or microprocessor are software modules for implementing the procedures described above.

While various example embodiments of the invention have been described above, it should be understood that they have been presented by way of example, and not limitation. It is apparent to persons skilled in the relevant art(s) that various changes in form and detail can be made therein. Thus, the disclosure should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A method for processing a query to a database, wherein the database comprises at least one dataset set having multiple items and indexed fields, the method comprising:

receiving a query to obtain an item set from the dataset in the database, wherein the query includes plural filter operations each defining a column condition for the dataset, the plural filter operations including at least first and second filter operations with the first filter operation having a first column condition and the second filter operation having a second column condition;

applying the first column condition for the first filter operation against the column index for the corresponding column so as to obtain a first set of item IDs identifying items in the dataset that satisfy the first column condition, wherein the first set of item IDs is sorted in item ID order;

applying the second column condition for the second filter operation against the column index for the corresponding column so as to obtain a second set of item IDs identifying items in the dataset that satisfy the second column condition, wherein the second set of item IDs is sorted in item ID order;

combining the first set of item IDs and the second set of item IDs using a logical set operation so as to obtain a set of result IDs, wherein the logical set operation is selected in a manner derived from the query and includes at least one of intersection, union, set difference and symmetric difference; and using the set of result IDs to fetch an item set from the dataset, wherein the first and second sets of item IDs are sorted in item ID order by operations that include:

storing the column index using a hybrid structure having at least a ChainTree structure and a ChainBlocks structure, wherein the ChainTree structure is defined by a B+tree that takes a key and maps the key to a paired structure having at least both of a pointer and a size, wherein the size is the number of IDs in the set, and the pointer points to a storage location of where the ID set starts, and wherein the ChainBlocks structure defines a doubly-linked list of multiple nodes, where each node contains an array of IDs to store the item ID sets for one or more keys, where a subset of the array includes up to all of an ID set;

wherein the first and second filter operations for the first and second column conditions comprise:

starting at a root node in the ChainTree structure;

repeatedly executing a search on keys using the value in the filter operation to find the child node to look in, until a leaf node is reached;

returning the paired structure having at least both of a pointer and a size if the leaf node contains a paired structure where the key matches the filter operation's value, and returning an empty set if the leaf node does not contain a paired structure where the key matches the filter operation's value;

reading the pointer of the returned paired structure, and reading one ID starting at such location, and moving to the next ID, wherein said step of reading is continued until the number of IDs read is equal to the size of the returned paired structure;

advancing to the next ChainBlock upon reaching the end of the IDs in the ChainBlock, and commencing a next repetition with the first ID in the next ChainBlock; and returning the read ID set.

2. The method according to claim 1, wherein the plural filter operations include three or more filter column conditions, and wherein said step of combining comprises combining the set of item IDs produced from each filter column condition in a manner derived from the query so as to obtain a set of result IDs.

3. The method according to claim 1, wherein the first and second sets of item IDs each comprise a sorted list of entries having at least an identifier to an item of data in the dataset.

4. The method according to claim 3, wherein each identifier defines a lookup value to an ID tree that resolves the identifier to a pointer to a storage location from which the item set is fetched.

5. The method according to claim 1, wherein the step of combining the first and second sets of item IDs uses an intersection operation.

6. The method according to claim 5, wherein in the step of combining the first and second sets of item IDs using an intersection operation, item IDs in one of the first and second sets of item IDs are used as probes into the other of the first and second sets of item IDs.

7. The method according to claim 1, wherein the column indexes are inverted indexes such that, for each value in a column of the dataset, the column index for such column includes a list of item IDs for items containing such value.

8. The method according to claim 1, wherein summary statistics are calculated for item referenced by the result set of IDs using statistics stored in the ChainBlock and the ChainTree structures without fetching the item from the dataset.

9. The method according to claim 1, wherein the array of IDs contained in the ChainBlock nodes are compressed such that range and set operations can be computed without de-compressing the array of IDs.

10. The method according to claim 1, wherein each item ID has a fixed size whereby the maximum number of IDs is limited based on the fixed size, and wherein the dataset is partitioned by sharding such that each partition contains no more than the maximum number of IDs.

11. The method according to claim 10 in which the dataset is partitioned by sharding into multiple partitions,
wherein the ChainTree structure is shared by multiple partitions such that a single traversal of the shared ChainTree resolves, for each partition, the storage location and number of IDs mapped to the key;
and further comprising processing for each partition on one or more threads that execute independently of any other threads or partitions.

12. The method according to claim 1, wherein the step of applying the first column condition is executed in a first thread of execution, and the step of applying the second column condition is executed in a second thread of execution that executes independently of the first thread.

13. A system for processing a query to a database, wherein the database comprises at least one dataset set having multiple items and indexed fields, the system comprising:
at least one processor; and
a memory,
wherein the processor executes process steps stored in the memory to perform the steps of:
receiving a query to obtain an item set from the dataset in the database, wherein the query includes plural filter operations each defining a column condition for the dataset, the plural filter operations including at least first and second filter operations with the first filter operation having a first column condition and the second filter operation having a second column condition;
applying the first column condition for the first filter operation against the column index for the corresponding column so as to obtain a first set of item IDs identifying items in the dataset that satisfy the first column condition, wherein the first set of item IDs is sorted in item ID order;
applying the second column condition for the second filter operation against the column index for the corresponding column so as to obtain a second set of item IDs identifying items in the dataset that satisfy the second column condition, wherein the second set of item IDs is sorted in item ID order;
combining the first set of item IDs and the second set of item IDs using a logical set operation so as to obtain a set of result IDs, wherein the logical set operation is selected in a manner derived from the query and includes at least one of intersection, union, set difference and symmetric difference; and
using the set of result IDs to fetch an item set from the dataset,
wherein the first and second sets of item IDs are sorted in item ID order by operations that include:
storing the column index using a hybrid structure having at least a ChainTree structure and a ChainBlocks structure,
wherein the ChainTree structure is defined by a B+tree that takes a key and maps the key to a paired structure having at least both of a pointer and a size, wherein the size is the number of IDs in the set, and the pointer points to a storage location of where the ID set starts, and
wherein the ChainBlocks structure defines a doubly-linked list of multiple nodes, where each node contains an array of IDs to store the item ID sets for one or more keys, where a subset of the array includes up to all of an ID set;
wherein the first and second filter operations for the first and second column conditions comprise:
starting at a root node in the ChainTree structure;
repeatedly executing a search on keys using the value in the filter operation to find the child node to look in, until a leaf node is reached;
returning the paired structure having at least both of a pointer and a size if the leaf node contains a paired structure where the key matches the filter operation's value, and returning an empty set if the leaf node does not contain a paired structure where the key matches the filter operation's value;
reading the pointer of the returned paired structure, and reading one ID starting at such location, and moving to the next ID, wherein said step of reading is continued until the number of IDs read is equal to the size of the returned paired structure;
advancing to the next ChainBlock upon reaching the end of the IDs in the ChainBlock, and commencing a next repetition with the first ID in the next ChainBlock; and
returning the read ID set.

14. A non-transitory computer-readable storage medium storing a program which, when executed by a computer, causes the computer to perform a method for processing a query to a database, wherein the database comprises at least one dataset set having multiple items and indexed fields, the method comprising the steps of:
receiving a query to obtain an item set from the dataset in the database, wherein the query includes plural filter operations each defining a column condition for the dataset, the plural filter operations including at least first and second filter operations with the first filter operation having a first column condition and the second filter operation having a second column condition;

applying the first column condition for the first filter operation against the column index for the corresponding column so as to obtain a first set of item IDs identifying items in the dataset that satisfy the first column condition, wherein the first set of item IDs is sorted in item ID order;

applying the second column condition for the second filter operation against the column index for the corresponding column so as to obtain a second set of item IDs identifying items in the dataset that satisfy the second column condition, wherein the second set of item IDs is sorted in item ID order;

combining the first set of item IDs and the second set of item IDs using a logical set operation so as to obtain a set of result IDs, wherein the logical set operation is selected in a manner derived from the query and includes at least one of intersection, union, set difference and symmetric difference; and using the set of result IDs to fetch an item set from the dataset, wherein the first and second sets of item IDs are sorted in item ID order by operations that include:
  storing the column index using a hybrid structure having at least a ChainTree structure and a ChainBlocks structure,
  wherein the ChainTree structure is defined by a B+tree that takes a key and maps the key to a paired structure having at least both of a pointer and a size, wherein the size is the number of IDs in the set, and the pointer points to a storage location of where the ID set starts, and
  wherein the ChainBlocks structure defines a doubly-linked list of multiple nodes, where each node contains an array of IDs to store the item ID sets for one or more keys, where a subset of the array includes up to all of an ID set;

wherein the first and second filter operations for the first and second column conditions comprise:
  starting at a root node in the ChainTree structure;
  repeatedly executing a search on keys using the value in the filter operation to find the child node to look in, until a leaf node is reached;
  returning the paired structure having at least both of a pointer and a size if the leaf node contains a paired structure where the key matches the filter operation's value, and returning an empty set if the leaf node does not contain a paired structure where the key matches the filter operation's value;
  reading the pointer of the returned paired structure, and reading one ID starting at such location, and moving to the next ID, wherein said step of reading is continued until the number of IDs read is equal to the size of the returned paired structure;
  advancing to the next ChainBlock upon reaching the end of the IDs in the ChainBlock, and commencing a next repetition with the first ID in the next ChainBlock; and
  returning the read ID set.

* * * * *